US008543447B2

(12) United States Patent
Corneil et al.

(10) Patent No.: US 8,543,447 B2
(45) Date of Patent: Sep. 24, 2013

(54) DETERMINING CAPABILITY INTERDEPENDENCY/CONSTRAINTS AND ANALYZING RISK IN BUSINESS ARCHITECTURES

(75) Inventors: Chad K. Corneil, Snoqualmie, WA (US); Eric S. Merrifield, Jr., Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 644 days.

(21) Appl. No.: 12/485,775

(22) Filed: Jun. 16, 2009

(65) Prior Publication Data

US 2010/0318395 A1 Dec. 16, 2010

(51) Int. Cl.
*G06Q 10/06* (2012.01)
(52) U.S. Cl.
CPC .................................. *G06Q 10/0637* (2013.01)
USPC ......................................................... 705/7.36
(58) Field of Classification Search
CPC .................................................. G06Q 10/0637
USPC ........................................................ 705/7.36
See application file for complete search history.

(56) References Cited

U.S. PATENT DOCUMENTS

| | | | |
|---|---|---|---|
| 7,162,427 B1 | 1/2007 | Myrick et al. | |
| 7,243,124 B1 | 7/2007 | Gardner et al. | |
| 7,467,198 B2 | 12/2008 | Goodman et al. | |
| 7,610,575 B2 * | 10/2009 | Sproule | 717/103 |
| 2006/0116922 A1 | 6/2006 | Homann et al. | |
| 2006/0178920 A1 * | 8/2006 | Muell | 705/8 |
| 2008/0033777 A1 * | 2/2008 | Shukoor | 705/8 |
| 2008/0097885 A1 * | 4/2008 | Schneider | 705/36 R |
| 2008/0195451 A1 * | 8/2008 | Abram | 705/8 |
| 2008/0201195 A1 | 8/2008 | Cohn et al. | |
| 2008/0275745 A1 | 11/2008 | Paradis | |
| 2009/0254399 A1 * | 10/2009 | Cristol | 705/8 |
| 2010/0082407 A1 * | 4/2010 | Akkiraju et al. | 705/10 |
| 2010/0138272 A1 * | 6/2010 | Rackham | 705/10 |
| 2011/0004863 A1 * | 1/2011 | Feblowitz et al. | 717/105 |

OTHER PUBLICATIONS

Steven M. Rinaldi, James P. Peerenboom, and Terrence K. Kelly, Identifying, Understanding, and Analyzing Critical Infrastructure Interdependencies, Complex Networks, IEEE Control Systems, Dec. 2001,http://bluecoat-01/?cfru=aHROcDovL2NpdGVzZWVyeC5pc3QucHN1LmVkdS92aWV3L2ZG9jL2Rvd25sb2FkP2RvaT0xMC4xLjEuEuODkuMjI3NiZyZXA9cmVwMSZ0eXBlPXBkZg.*
Olszak, Celina M., et al., "Business Intelligence Systems in the Holistic Infrastructure Development Supporting Decision-Making in Organisations", Interdisciplinary Journal of Information, Knowledge, and Management vol. 1, 2006, pp. 47-58.
Carlock, Paul G., et al., "Development and Implementation of an Architecture for the National Airspace System", Systems and Information Technology Review Journal, Spring/Summer 1998, pp. 5-16.
Webb, Mike, Capabilities-Based Engineering Analysis (CBEA), Based on information and belief available, at least as early as Jun. 15, 2009, 8 pages.
Marsh, Garden State Chapter Association of Contingency Planners, "Gaining Competitive Advantage by Understanding and Addressing the Risks within Your Supply Chain Risk Management Overview", Dec. 2, 2008, 43 pages.

* cited by examiner

*Primary Examiner* — Romain Jeanty
*Assistant Examiner* — Kurtis Gills
(74) *Attorney, Agent, or Firm* — Workman Nydegger

(57) ABSTRACT

The present invention extends to methods, systems, and computer program products for determining capability interdependency and analyzing risks in business architectures. Accordingly, embodiments of the invention can be used to drive an understanding of the relative interdependency (complexity) of a capability and how capabilities impact one another. Connectedness and/or data exchanged between capabilities can be used to formulate relative interdependency (complexity) of a capability and can be analyzed to inform a number of strategies from data architecture and business intelligence and project risk. Other risk/impact analysis data can be combined with interdependency (complexity) to present risk/impact analysis scenarios for organizations.

14 Claims, 22 Drawing Sheets

DETERMINING CAPABILITY INTERDEPENDENCY/CONSTRAINTS AND ANALYZING RISK IN BUSINESS ARCHITECTURES

CROSS-REFERENCE TO RELATED APPLICATIONS

Not Applicable.

BACKGROUND

Background and Relevant Art

Businesses have complex operations. An understanding of these operations is important to a business in order to, for example, prepare for change, account for costs, etc. Accordingly, various mechanisms have been developed to model and represent businesses. Some mechanisms include manual generation of diagrams that represent business processes that describe how work is done. For example, trained individuals can analyze all aspects of a business to identify business capabilities and interrelationships and interdependencies between the business processes. Based on the analysis, the trained individuals can generate the representative diagrams. However, accurate analysis of a business from a business process point-of-view can take an extended period of time. Further, once representative diagrams are generated such diagrams are not easily modified.

Unfortunately, since many business processes are dynamic (i.e., can change over time), a manually generated representation of business processes may be outdated before it is even completed. Further, even if a manually generated representation of business processes were accurate at the time it was completed, any change in business processes after the business representation is generated would cause the business representation to be incorrect. Thus, manually generated representations provide limited, if any, ability for a business to determine how simulated and/or hypothetical changes to various business capabilities would affect the business.

At least in part as a result of the deficiencies in manually generated business representations, some computerized mechanisms have been developed to generate business representations. These computerized mechanisms use various techniques to represent business and the required business functions mostly focused on modeling business processes and detailed procedures that support those processes. For example, some computerized mechanisms present a graphical view of business processes at a user-interface. To some limited extent, these graphical views can be altered to simulate the effect of different business capabilities on a business.

However, most of these computerized mechanisms focus on "how" the business is executed, conflating (or combining) various different layers (or types) of input data, such as, for example, organizational structures, procedures, process flows, and supporting technology. The stability of the input data (i.e., the half life of the information represented) potentially varies dramatically between the different input layers (or types), rendering the useful life time of a generated view only as valid as the least stable input. Conflating (or combining) interrelated, yet non-dependent, input data together can also result in obscured views of how a business functions and lead to unnecessary and costly improvement efforts of the modeled business, without the ability to determine the effect of changes in each individual layer.

Further, computerized mechanisms often include hard-coded data types and hard-coded representations for business modeling input data. These hard-coded data types and representations can be difficult to alter without access to source code. Thus, the flexibility and extensibility of modeling businesses and generating corresponding views is limited. For example, it may difficult to alter pre-defined data formats such that a business capability can be represented in a different way or such that a previously undefined business capability can be added.

All of the above for mentioned difficulties associated with modeling businesses limit the usefulness of visual presentations of such models. For example, most visual presentations of business models, such as, for example, business maps, center on data representations in the context of specific isolated tasks, activities, systems, or platforms. Visualizing and navigating to adjunct, potentially useful business data, organizations structure, partners, systems, or relevant business process flows, is cumbersome and often impossible. For example, there is typically no mechanism to visually navigate from data in one business layer, such as, for example, a business process flow layer, to data in another business layer, such as, for example, a organizational structure layer indicating personnel that implement/manage a business process flow or, for example a systems/platform data layer to another systems/platform data layer indicating key integration points between seemingly disparate systems/platforms.

More particularly, there is limited if any mechanisms to get an all up view of an organization and determine what level of risk is assumed when a organization decides to invest or related or unrelated programs or projects. It is also difficult to determine what level of impact an investment will have on underlying process, people, and technology and data that supports a business area.

BRIEF SUMMARY

The present invention extends to methods, systems, and computer program products for determining capability interdependency and analyzing risks in business architectures. Embodiments of the invention include identifying interdependency between business capabilities and underlying components that provide functionality to the business capabilities. A computer system accesses a business capability model for an organization. The business capability model includes a plurality hierarchically arranged business capabilities. Each business capability represents a portion of what the business organization does. Each business capability is connected to one or more other business capabilities in the capability model.

In some embodiments, the dependence and constraints of a business organization on a business capability is determined from then interconnecting of the business capabilities. For each business capability in the business capability model, the dependence of the business organization on the business capability is determined. The number of connections between the business capability and other business capabilities is determined. Each connection between the business capability and another business capability is identified. The connection type (e.g., one way (either to or from), bi-directional, connection attributes, etc.) of each identified connection is determined. For example, a connection type can be identified based on a connection being to an internal or external capability. A dependence value is calculated from the business capability based on number and type of connections between the business capability and the other business capabilities.

In other embodiments, the dependence and constraints of a business organization on a business capability is determined from the data that flows through the business capability. A data model for the business organization is accessed. The data model models the business organizations business data into different data types. For each business capability in the business capability model, a processor determines the dependence of the business organization on the business capability. The different data types that flow through the business capability are identified. The frequency of each identified data type flowing through the business capability is also identified. A dependence value is assigned to the accessed business capability based on frequencies of the identified data types flowing through the business capability.

From dependence values and constraints an interdependency and constraint view of business capability and the business organization overall is created. The interdependence of each business capability relative to the other business capabilities is assigned based on the calculated dependence values. Business capabilities are spatially arranged relative to one another according the hierarchal arrangement. Visual indicators are assigned to each business capability based on the calculated interdependence for the business capability. Accordingly, business capabilities with different calculated interdependence can be visually distinguished from one another.

In further embodiments, interdependency values for a business organization are presented along with other risk/impact analysis data in a risk/impact analysis view. Capability values and/or capability complexities are calculated from interdependency values. Capability values and/or capability complexities are used along with the other risk/impact analysis data (e.g., capability costs, capability maturities/predictabilities, capability values, etc.) to formulate risk/impact analysis data for the business organization. The risk/impact data is presented in a risk/impact analysis view. The risk/impact analysis view includes visual indicators to indicate the relative risk associated with business capabilities (e.g., relative to one another) in the business organization.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
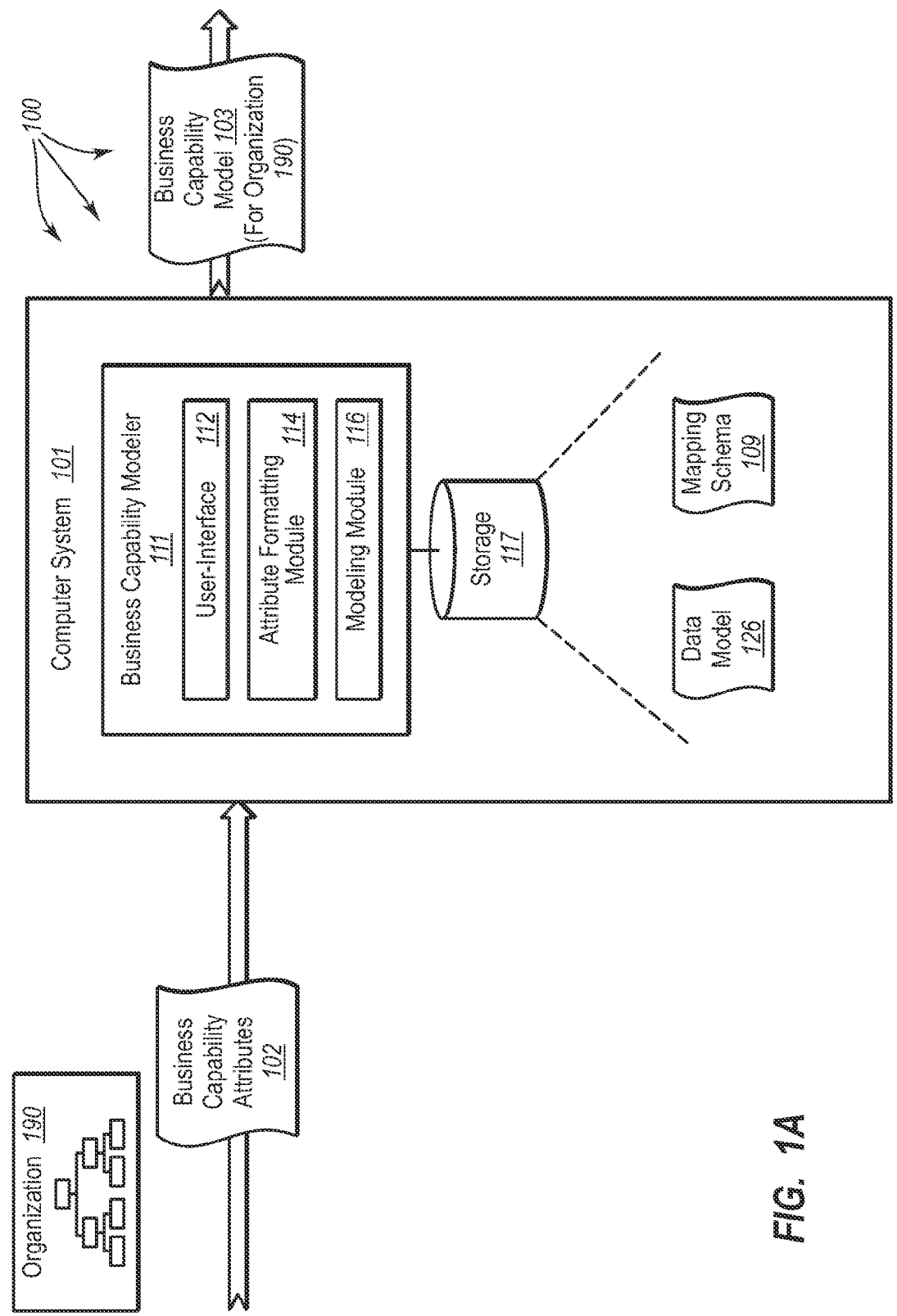
FIG. 1A illustrates an example computer architecture that can be used to implement efficient and flexible business modeling based upon structured business capabilities.

The present invention extends to methods, systems, and computer program products for determining capability interdependency and analyzing risks in business architectures. Embodiments of the invention include identifying interdependency between business capabilities and underlying components that provide functionality to the business capabilities. A computer system accesses a business capability model for an organization. The business capability model includes a plurality hierarchically arranged business capabilities. Each business capability represents a portion of what the business organization does. Each business capability is connected to one or more other business capabilities in the capability model.

In some embodiments, the dependence and constraints of a business organization on a business capability is determined from then interconnecting of the business capabilities. For each business capability in the business capability model, the dependence of the business organization on the business capability is determined. The number of connections between the business capability and other business capabilities is determined. Each connection between the business capability and another business capability is identified. The connection type (e.g., one way (either to or from), bi-directional, connection attributes, etc.) of each identified connection is determined. For example, a connection type can be identified based on a connection being to an internal or external capability. A dependence value is calculated from the business capability based on number and type of connections between the business capability and the other business capabilities.

In other embodiments, the dependence and constraints of a business organization on a business capability is determined from the data that flows through the business capability. A data model for the business organization is accessed. The data model models the business organizations business data into different data types. For each business capability in the business capability model, a processor determines the dependence of the business organization on the business capability. The different data types that flow through the business capability are identified. The frequency of each identified data type flowing through the business capability is also identified. A dependence value is assigned to the accessed business capability based on frequencies of the identified data types flowing through the business capability.

From dependence values an interdependency and constraints view of business capability and the business organization overall is created. The interdependence of each business capability relative to the other business capabilities is assigned based on the calculated dependence values. Business capabilities are spatially arranged relative to one another according the hierarchal arrangement. Visual indicators are assigned to each business capability based on the calculated interdependence for the business capability. Accordingly, business capabilities with different calculated interdependence can be visually distinguished from one another.

In further embodiments, interdependency values for a business organization are presented along with other risk/impact analysis data in a risk/impact analysis view. Capability values and/or capability complexities are calculated from interdependency values. Capability values and/or capability complexities are used along with the other risk/impact analysis data (e.g., capability costs, capability maturities/predictabilities, capability values, etc.) to formulate risk/impact analysis data for the business organization. The risk/impact data is presented in a risk/impact analysis view. The risk/impact analysis view includes visual indicators to indicate the relative risk associated with business capabilities (e.g., relative to one another) in the business organization.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a processor at a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

In this description and in the following claims, "business capability attribute" is defined as any attribute that can be used to model a business capability or part of a business capability. Business capability attributes are defined to include: business capability data (what kind of data is used by the capability), business capability applications, business capability communications, business capability service level expectations, and business capability measurements.

Business capability attributes are also defined to include measurement and analysis attributes of a business capability. Measurement and analysis attributes can indicate how the success of a business capability is measured, who owns the business capability, who is the customer of the capability, notification criteria for variations in the business capability, workarounds if a business capability is not available, acceptable variations in inputs to and outputs of the business capability, the stability and/or volatility of the business capability, the importance of the capability, the maturity of the capability, etc.

In this description and in the following claims, a "business relationship attribute" is defined as an attribute that can be used to model a relationship between a first business capability and a second different business capability A relationship can be, for example, a dependency, a connection, or a boundary. A dependency can indicate what has to occur for a modeled business capability to start, external events that occur for a business capability to stop, or other business capabilities that depend on the business capability. A connection indicates how one business capability relates to other business capabilities. A boundary indicates if influences on a business capability are internal (e.g., people, process, technology inside a company) or external (e.g., regulations, customers, partners, other participants in a value added network) to the business capability. Accordingly, a business relationship attribute can be used to model a relationship between business capabilities that are under the control of different entities participating in a value added network.

In this description and the following claims, a "business architecture" is defined as the overall design of grouping of business capabilities. A business architecture can represent a business (or portion thereof). A business architecture can include a variety of different types of business related entities, such as, for example, a corporation (profit or non-profit), a partnership, a limited partnership ("LP"), a limited liability partnership ("LLP"), a limited liability corporation ("LLC"), a sole proprietorship, etc.

Additionally, a business architecture can represent a business model of or within an organization; a business architecture can represent defined strategy(ies) Or objectives within an organization.

Accordingly, a company's business architecture can span externally physical boundaries (e.g., walls, buildings, etc.), internally physical boundaries (e.g., divisions, departments, etc.), and logical boundaries (e.g., a fiscal year end, a perceived service boundary, security etc.). Thus, an outsourced business capabilities can also be viewed as part of the business architecture for a company even though the outsourced business capability is not performed by the company. A business architecture can also be used to represent a value added network (VAN) that includes business capabilities under the control a number of different entities that are configured to interoperate with one another to generate a stream of work. Business architectures can be past, current (as-is), or future (to-be) architectures of a business Generally, a business capability indicates "what" work is performed and other components within various business layers (e.g., people, process, technology, data, regulations, etc.) indicate "how" work is performed. Business capabilities can be viewed as organization agnostic, even though organizations can be modeled as a grouping of interconnected business capabilities. That is, any number of organizations can use the same business capability (although it may be implemented different (i.e., have a different "how").

Multiple different implementations of "how" work is performed can also each contribute to "what" work is performed. For example, an airline can have a capability to "check in passenger". How checking in a passenger is performed can occur in a number of different ways (either at the same or in different organizations). For example, a first combination of components from can be blended together to represent online check in, a second different combination of components can be blended kiosk check in, and a third different combination of components can be blended counter check in, for airline flights. Each of online check in, kiosk check in, and counter check in can contribute to a business capability for checking in passengers.

In this description and in the following claims, a "schema" is defined as an expression of a shared vocabulary between a plurality of computer systems, modules, or entities that allows the plurality of computer systems, modules, or entities to process data according the expressed shared vocabulary. A schema can define and describe classes of data using constructs (e.g., name/value pairs) of a schema language. The schema constructs can be used to constrain and document the meaning, usage, and relationships of data types, elements and their content, attributes and their values, entities and their contents, and notations, as used in a specified application, such as, for example, a business capability model. Thus, any computer system, module, or that can access a schema can process data in accordance with the schema. Further, any computer system, module, or entity that can access a schema can compose or modify data for use by other computer systems and/or modules that can also access the schema.

A schema can be utilized to define virtually any data type including logical, binary, octal, decimal, hexadecimal, integer, floating-point, character, character string, user-defined data types, and combinations of these data types used to defined data structures. Some examples of user-defined data types are business capability properties, business capability inputs and outputs, business capability processes, business capability connections, and business capability service level expectations. A data type can also be defined to reference or link to other data types in a schema hierarchy including, but not limited to data entities within a logical or conceptual data model.

extensible Markup Language ("XML") is one way of defining a schema. XMIL schema can define and describe a class of XML documents using schema constructs (e.g., name/value pairs) of an XML schema language. These schema constructs can be used to constrain and document the meaning, usage, and relationships of data types, elements and their content, attributes and their values, entities and their contents, and notations, as used in XML documents. Thus, schema is also defined to include Document Type Definitions ("DTD"), such as, for example, DTD files ending with a ".dtd" extension and World Wide Web Consortium ("W3C") XML Schemas, such as, for example, XML Schema files ending with a ".xsd" extension. However, the actually file extension for a particular DTD or XML schema is not important.

Embodiments of the invention can include a variety of components that are connected to one another over (or be part of) a network, such as, for example, a Local Area Network ("LAN"), a Wide Area Network ("WAN"), and even the Internet. Accordingly, each of the depicted components as well as any other connected components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

FIG. 1A illustrates an example computer architecture 100 that can be used to flexibly model business functions. Generally, computer architecture 100 can be configured to model received business capability attributes into a business capability model. As depicted in computer architecture 100, computer system 101 includes business capability modeler 111 and storage 117. Business capability modeler 111 further includes user-interface 112, attribute formatting model 114, and modeling module 116. User-interface 112 is configured to interface between a computer system user and computer system 101. User-interface 112 can provide an interface for the computer system user to enter data (e.g., business capability attributes) into business capability modeler 111 and to view presented business capability models presented by business capability modeler 111.

As depicted, data model 126 and mapping schema 109 are stored in storage 117. Data model 126 can be used to model business capability attributes into a business capability model. Thus, data model 126 can be a schema for modeling business capability attributes. Data model 126 can include data format definitions for business capabilities.

Attribute formatting module 114 is configured to format business capability attributes in accordance with data formats in data model 126. Accordingly, attribute formatting module 114 can access business capability attributes and format the business capability attributes in accordance with a schema of data model 126. For example, attribute formatting module 114 can format a "fixed cost allocation" attribute to be of a currency data type based on data definitions in a schema.

Modeling module 116 is configured to graphically represent formatted business capability attributes as a business capability model. Modeling module 116 can then present the business capability module at user-interface 112. User-interface 112 is configured to interface between a computer system user and computer system 101.

Thus, business capability modeler 111 can model entities participating in organization 190. For example, capability modeler 111 can receive business capability attributes 102 for organization 190 (although not necessarily submitted by organization 190). Attribute formatting module 114 can format business capability attributes 102 in accordance with data formats in data model 126. Modeling module 116 can graphically represent the formatted data attributes a business capability model 103. Modeling business capabilities can include modeling connections to other models and other software. For example, modeling module 116 can model connections from a business capability model to other architecture domains, including information, application, and technical architectures. Modeling module 116 can then present business model 103 at user-interface 112. Accordingly, business capability modeler 111 can model business capabilities of organization 190.

Figure 1B:
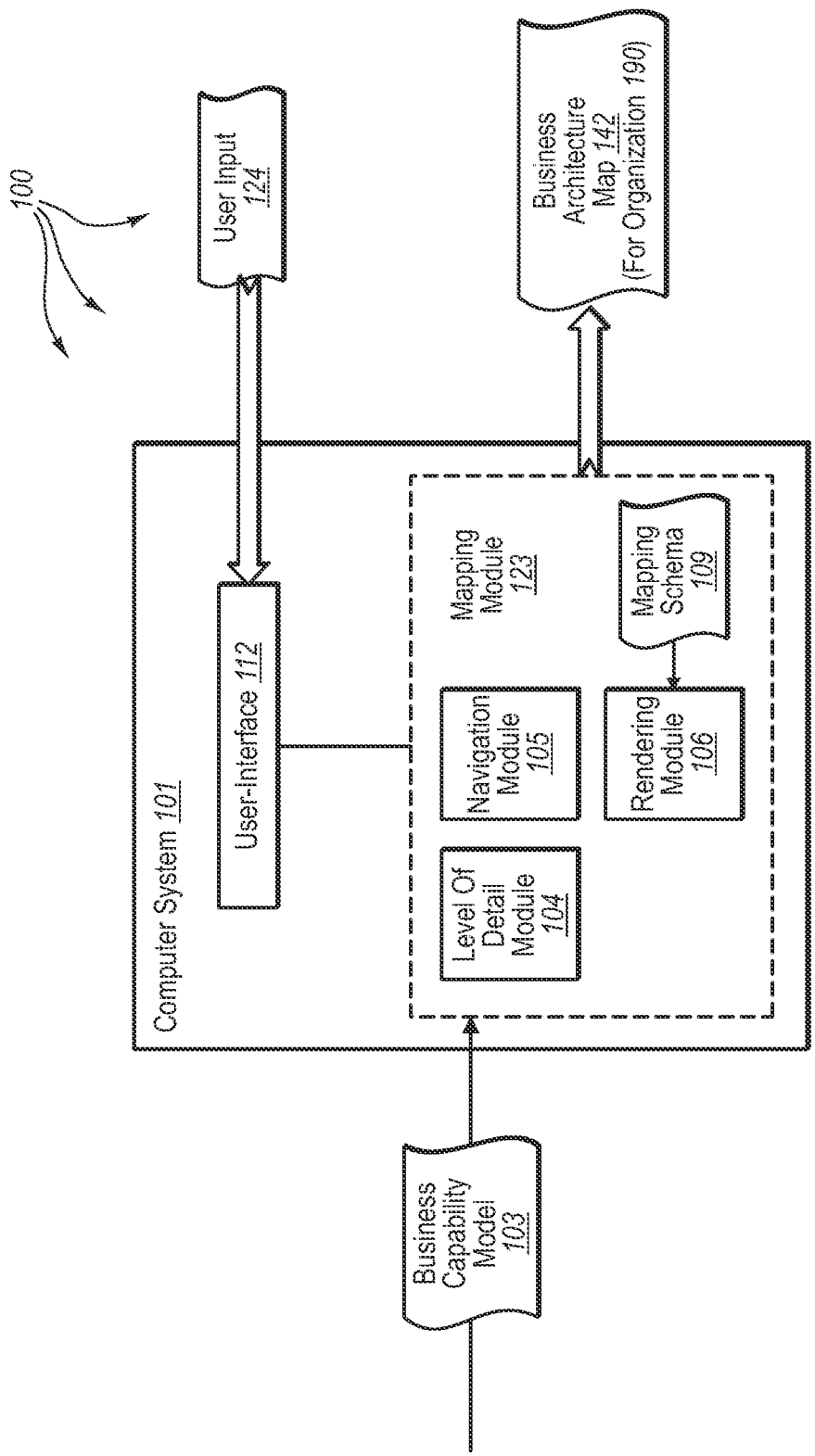
FIG. 1B illustrates an example computer architecture that can be used to associate and visualize schematized business networks.

FIG. 1B illustrates another portion of example computer architecture 100 that can be used to associate and visualize schematized business networks. Generally, computer architecture 100 can be configured to receive a business capability model (e.g., business capability model 103) and render a corresponding navigable business map (e.g., business architecture map 142). As depicted in computer architecture 100, computer system 101 additionally includes mapping module 123. User-interface 112 can provide an interface for the computer system user to enter user-input 124 (e.g., selecting operations to business architecture maps) into mapping module 103 and to view output from mapping module 103.

Generally, mapping module 123 can include modules configured to render visual representations of business models. For example as depicted in computer architecture 100, mapping module 123 includes rendering module 108, mapping schema 109, level of detail module 104, and navigation module 106.

Rendering module 108 is configured to utilize mapping schema 109 to transform schematized business capability attributes and business relationship attributes (e.g., in business capability model 103) into visually renderable (e.g., graphical) objects. Mapping schema 109 can provide a translation between schematized business capability attributes and business relationship attributes and corresponding graphical objects.

Level of detail module 104 is configured to control levels of detail within a visual representation of a business model. For example, level of detail module 104 can hide or provide details with a visual representation in response to user-input. Thus, level of detail module 104 can cause less than all the data in business capability attribute and business relationship attribute graphical objects to be rendered.

Level of detail module 104 can also alter a level of detail such that a current level of detail is increased or decreased. For example, level of detail module 104 can focus (or "zoom-in") on levels of detail as requested by a user (e.g., to drill down on a specified part of a business map). On the other hand, level of detail module 104 can also abstract (or "zoom-out") levels of detail as requested by a user (e.g., to provide an overview of part of a business map). Level of detail module 104 can also display different portions of a business map with different levels of detail. Thus, a user can visualize greater detail on specified portions of a business map and visualize lesser detail on other portions of a business map. Using varied levels of detail can facilitate drilling down into a specified portion of a business map in increased detail and yet still providing context (i.e., reduced detail surrounding components) for the increased detail portions.

Navigation module 106 is configured to facilitate navigation between business capabilities via relationships between the business capabilities.

Thus generally, computer architecture 100 is configured to receive business capability attributes, model the business capability attributes into a business capability model, and render the business capability model as a navigable business architecture map.

In some embodiments, business models and data format definitions for business capabilities are generally described as indicated in Table 1.

TABLE 1

| | |
|---|---|
| Models | Models serve to group capabilities into distinct groups that describe a single business. Models can contain all the capabilities defined for the business as well as how any defined capabilities relate to each other in terms of hierarchical decomposition and process flow relationships. Models facilitate the segmentation of data in a repository into distinct business models which can be compared with one another but are separate from each other. Further, while capability data is defined within a model, other data elements of the data model are outside of the model and facilitate the comparison of different models with one another. |
| Capabilities | Capabilities are individual business functional areas that are modeled in at least three different ways in the model. Capabilities can be modeled as individual things with their own set of properties; as a decomposition hierarchy |

TABLE 1-continued

| | |
|---|---|
| | of functional areas; and as connected in simple business process flows. Coarser (or higher level) capabilities can include a set of more granular (or lower level) capabilities, such as, for example, when a higher level capability is decomposed into its constituent parts. The assignment of properties to capabilities may occur at multiple levels in a hierarchy, which can be used to control later data transformations. For example, when a higher level capability is manipulated through a transformation, corresponding lower level capabilities' properties can be considered in the transformation |
| Capability Inputs and Outputs | Capability Inputs and Outputs are the artifacts and events that are consumed and/or produced by business capabilities. They represent what is outward and visible about the behavior of the capabilities. Inputs can be consumed and outputs can be produced independently of other inputs and outputs. For example, there is no requirement that all the inputs for a capability be consumed before the capability starts. Likewise, there is no requirement that all the processing of a capability be completed before an output can be produced. |
| Processes | Processes are networks of business capabilities that are connected in a flow to illustrate and end-to-end view of a business process. Processes define the connections between capabilities that enable larger business functions. Processes modeled in the data model can refer to cross-capability processes that represent traversal of boundaries between capabilities. Further, each implementation of a capability is also a network of processes. For example, a capability can be part of a process. The part of the process can include further, limited scope, capabilities. |
| Connections | Connections are used to represent relationships between business capabilities. Connections can be data connections over which data, such as, for example, a business document, can flow between those capabilities. However, other types of connections are also possible. Connections may also refer to oversight or management of a business function, as frequently occurs in regulated areas of business activity. Connections can be typed such that connection types are the same across all models. Typed connections can be used to facilitate model comparisons. |
| Service Levels | Service levels refer to the general expectation of the performance of a capability. Service levels attach performance and accountability attributes to a capability in varying degrees of formality (e.g., contractual) and time (e.g., historical, current, target, and maximum). In some embodiments, a capability includes a verb and noun phrase (or such a verb-noun phrase can be construed from the capability description). Service level descriptive data associated with the capability indicates how well the capability performs the action implied by the phrase. For example, Approve Loan Application might have a service level expectation of 2 days. |

Figure 2:
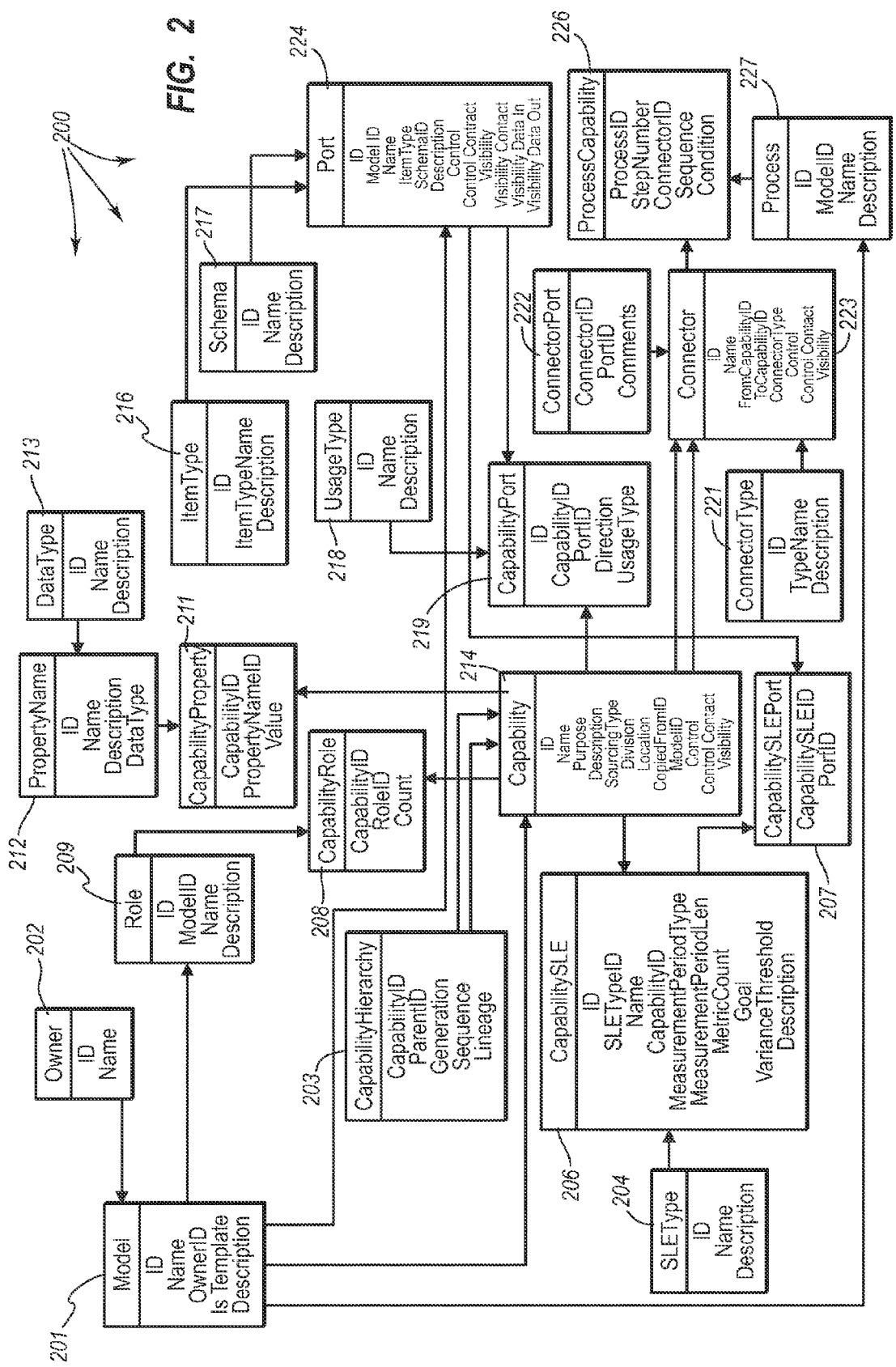
FIG. 2 illustrates a portion of an example capability modeling schema that can be used for efficiently and flexibly business modeling based upon structured business capabilities.

FIG. 2 illustrates a portion of an example capability modeling schema 200 that can be used for efficiently and flexibly business modeling based upon structured business capabilities. Capability modeling schema 200 can include data formats for modeling business capability properties, business capability inputs and outputs, business capability processes, business capability connections, and business capability service level expectations. It should be understood that business capability modeling schema 200 can be one of a plurality of schemas that includes data definitions for modeling a corresponding portions of an organization.

Depicted in FIG. 2, schema 200 includes capability data format 214. Generally, capability data format 214 can be described as indicated in Table 2.

TABLE 2

| Name | Data Type | Description |
|---|---|---|
| ID | int | Key to the capability and is used to relate other data entities to this capability. |
| Name | varchar(256) | Name that is unique within a particular model. |
| Purpose | varchar(1000) | Short description of the capability. |
| Description | varchar(8000) | A more detailed description of the capability and may explain relationships and properties of this capability as well as the capability itself |
| SourcingType | int | This field can have three values: Internal, Outsourced, or Both. It indicates whether or not the capability is performed by an organization that is internal (part of) the organization that "owns" the model; or an organization that is a supplier of the capability to the "owner" of the model; or it is performed by both internal and external suppliers. |
| Division | varchar(100) | Identifies the business organizational area where a capability is performed. |
| Location | varchar(100) | Geographical location where the capability is performed. |
| CopiedFromID | int | Indicates the specific capability (and hence template model) from which this capability was copied. Can be a system-set value. |
| ModelID | int | Indicates the model to which this capability belongs. |
| Control | varchar(100) | Indication of controlling entity that controls the capability for purposes of regulating visibility of the capability |
| Control Contact | Varchar(100) | Name, phone number, and E-mail address of the owner, if it is Yes in the Control value |
| Visibility | Complex | Visibility of capability to other entities. Visibility can vary per entity. For example, visibility can be logical (yes/no) on a per entity basis. Thus, visibility can be an array of logical values. Different levels of |

TABLE 2-continued

| Name | Data Type | Description |
|---|---|---|
| | | visibility can also be configured. For example, visibility for general purpose use, visibility specifically for use in participating in a value added network, read-only access, read/write access, etc. |

Depicted in FIG. 2, schema 200 includes capability hierarchy data format 203. Generally, capability hierarchy data format 203 can be described as indicated in Table 3.

TABLE 3

| Name | Data Type | Description |
|---|---|---|
| CapabilityID | int | Links to a capability. |
| ParentID | int | Links to a capability in the same model and indicates the parent of this capability in a hierarchical view of the model's capabilities. |
| Generation | int | Part of the lineage key which is used in certain queries. |
| Sequence | int | Part of the lineage key which is used in certain queries. |
| Lineage | varchar(20) | Indicates the entire ancestral lineage of a capability and used to perform hierarchical sorts. |

Depicted in FIG. 2, schema 200 includes capability property data format 211. Generally, capability property data format 211 can be described as indicated in Table 4.

TABLE 4

| Name | Data Type | Description |
|---|---|---|
| CapabilityID | int | Links to a capability. |
| PropertyNameID | int | Links to a user-defined property. |
| Value | varchar(250) | Value of the property for this capability. |

Depicted in FIG. 2, schema 200 includes capability port data format 219. Generally, capability port data format 219 can be described as indicated in Table 5.

TABLE 5

| Name | Data Type | Description |
|---|---|---|
| ID | int | Key to the capability port and is used to relate this port to other entities. |
| CapabilityID | int | Links to the capability that is referenced by this relationship. |
| PortID | int | Links to the port that is referenced by this relationship. |
| Direction | int | Has three values and indicates whether or not the item is input into the referenced capability, output from the referenced capability, or it flows both directions. |
| UsageType | int | Links to the UsageType entity and indicates how the capability uses this item. Examples are "Read only", "Read and update", "Create", etc. |

Depicted in FIG. 2, schema 200 includes capability role data format 208. Generally, capability role data format 208 can be described as indicated in Table 6.

TABLE 6

| Name | Data Type | Description |
|---|---|---|
| CapabilityID | int | References a specific capability and serves to link that capability with a specific role. |
| RoleID | int | References a specific role and links it to the referenced capability. |
| Count | int | Indicates the number of people in this role that are required to perform this capability. A value of '0' indicates that the role participation has not been quantified. |

Depicted in FIG. 2, schema 200 includes SLE type data format 204. Generally, SLE type data format 204 can be described as indicated in Table 7.

TABLE 7

| Name | Data Type | Description |
|---|---|---|
| ID | int | Key to the SLEType entity and is used to relate this role to CapabilitySLE entities. |
| Name | varchar(100) | Uniquely names the type of service level that is described in this entity. This entity is assumed to be read-only by modelers because the modeling tools rely on the value of these entries to visualize service levels. Some values for service level types include "Duration", "Throughput", "Monetary Cost", "Time Cost" and "Concurrency". |
| Description | varchar(4000) | A detailed description of the service level type and how to describe specific service levels related to capabilities. |

Business capability attributes can also represent Service Levels. Service Level Agreement ("SLA") attributes can indicate an agreement the business capability is to adhere to. Service Level Expectation ("SLE") attributes can indicate a service level expectation, such as, for example, a less formal and/or non-contractual based expectation of what a business capability is to do. An SLE can be used to indicate how the success of a corresponding business capability is measured (either subjectively or objectively), who owns the business capability, who is the customer of the capability. An SLE can also be used to indicate what has an impact of the outcome the business capability, such as, for example, people, process, technology, inputs, outputs, etc. For inputs (e.g., people, process, technology, etc), an SLE can indicate the acceptable variation on quality and volume that allow the business capacity to perform its functions and can also trigger events, such as, for example, evaluating other vendors/partners. For outputs, an SLE can indicate the acceptable variations in time, volume, and quality and corresponding thresholds.

An SLE can include an indication of escalation/notification criteria for variations, what is the timeframe for escalation/notification, how escalation/notification impact other timeliness schedules, or success metrics. An SLE can also include potential workarounds if the business capability becomes unavailable.

An SLE can indicate the stability/volatility of the business capability, for example, how often does the capability change, how much of the business capability is related to normal day-to-day activity, and how much of the business capability is exception based. An SLE can also indicate how critical and/or core a business capability is to the overall goals and success of a business. Embodiments of the present invention can be configured to model business capabilities based upon SLE attributes for representing these (as well as other aspects) of SLEs.

Service Level Goal ("SLG") attributes can indicate business capability goals for specified periods of time, for example, weeks, months, quarters, etc. Service Level Potential ("SLP") attributes can indicate a capability range (e.g., minimum/maximum units per hours) of a business capability. Service Level History ("SLH") attributes can indicate how a business capability has performed over a specified period of time, for example, the last week, month, etc. Service Level Delta ("SLD") attributes can indicate when a capability will change, for example, in the context of a Change Lifecycle, and can indicate a planned delta in the SLE, SLP, and SLG that will result.

Depicted in FIG. 2, schema 200 includes Capability SLE data format 206. Generally, Capability SLE data format 206 can be described as indicated in Table 8.

TABLE 8

| Name | Data Type | Description |
|---|---|---|
| ID | int | Key to the Role entity and is used to relate this role to Capability entities. |
| SLETypeID | int | References the SLEType entity and identifies a specific way to measure a service level. |
| Name | varchar(50) | A unique name for the service level definition. |
| CapabilityID | int | References the capability to which this service level applies. |
| MeasurementPeriodType | varchar(50) | Names the unit of measure for the service level. For "Duration" type service levels, this should be a time period. For a "Monetary Cost" SLE type, "Dollars" or "Thousands of dollars" would be appropriate. |
| MeasurementPeriodLen | int | If the SLE type references a "Throughput" type of SLE, this field indicates the length of the measurement period for throughput. |
| MetricCount | int | An actual (current status/performance or historical performance) measurement of the SLE, such as the number of days of duration, the number of items completed for throughput, the amount of dollars for monetary cost, etc. |
| Goal | int | A target for future performance such as the number of days of duration, the number of items completed for throughput, the amount of dollars for monetary cost, etc. |
| VarianceThreshold | int | How much variation in performance (e.g., from a goal) is tolerated before a |

TABLE 8-continued

| Name | Data Type | Description |
|---|---|---|
| | | variation is noted or notification is sent. For example, when a variance threshold is exceeded an electronic mail message can be sent to appropriate management personnel |
| Description | varchar(2000) | A detailed description of the SLE for this capability. |

Depicted in FIG. 2, schema 200 includes Capability SLE Port data format 207. Generally, Capability SLE port data format 207 can be described as indicated in Table 9.

TABLE 9

| CapabilitySLEID | int | References a particular service level for a specific capability as described in a CapabilitySLE entity. It serves to link a particular service level to a particular input or output item. |
| PortID | int | References a particular input or output item of a capability and links a service level to the specific item that is being measured. For example, this might reference mortgage approvals for a duration service level for a mortgage processing capability and the entire service level definition might thereby describe that 100 mortgage approvals are completed every day for the mortgage processing capability. |

Depicted in FIG. 2, schema 200 includes connector type data format 221. Generally, connecter type data format 221 can be described as indicated in Table 10.

TABLE 10

| Name | Data Type | Description |
|---|---|---|
| ID | int | Key to the ConnectorType entity and is used to describe the connection type in the Connector entity. |
| TypeName | varchar(50) | A unique name that describes the type of connection. Examples are "Collaborative", "Controlling", "Dependent", etc. |
| Description | varchar(4000) | A detailed description of the connection type and helps modelers understand what connections mean in their models. |

Depicted in FIG. 2, schema 200 includes connector data format 223. Generally, connecter data format 223 can be described as indicated in Table 11.

TABLE 11

| Name | Data Type | Description |
|---|---|---|
| ID | int | Key to the Connector entity and indicates the connection between two capabilities. This key is used to link this connection to other entities. |
| Name | varchar(256) | A comment that is associated with this connection between two capabilities. |
| FromCapabilityID | int | References the capability that is the source capability. Depending on the ConnectorType, the meaning of being the source capability may differ slightly. |

TABLE 11-continued

| Name | Data Type | Description |
| --- | --- | --- |
| ToCapabilityID | int | References the capability that is the target capability. Depending on the ConnectorType, the meaning of being the target capability may differ slightly. |
| ConnectorType | int | Link to the ConnectorType entity and indicates what the relationship between the two referenced capabilities really means. Examples are "Collaborative", "Controlling", "Dependent", etc. |
| Control | varchar(100) | Indication of controlling entity that controls the connector for purposes of regulating visibility of the connector. |
| Control Contact | varchar(100) | Name, phone number, and E-mail address of the owner. |
| Visibility | Complex | Visibility of connector to other entities. Visibility can vary per entity. For example, visibility can be logical (yes/no) on a per entity basis. Thus, visibility can be an array of logical values. When a connector is not visible to an entity, ports associated with the connector are also not visible to the entity. Different levels of visibility can also be configured. For example, visibility for general purpose use, visibility specifically for use in participating in a value added network, read-only access, read/write access, etc. |

Depicted in FIG. 2, schema 200 includes model data format 201. Generally, model data format 201 can be described as indicated in Table 12.

TABLE 12

| Name | Data Type | Description |
| --- | --- | --- |
| ID | int | Key to the model and is used to relate other data entities to this model. |
| Name | varchar(150) | A unique name that identifies the model. |
| OwnerID | int | Points to the owner of the model. An owner can own many models. |
| IsTemplate | bit | Controls the ability of a modeler to modify this model. If this field is true, it means that this model is to be used as a template for other models and can thus be used to compare the derived models, even after properties are changed by modelers in the derived models. Therefore, this model cannot be changed by normal editors of models. Defaults to false |
| Description | varchar(2000) | Textual description of the model. |

Depicted in FIG. 2, schema 200 includes owner data format 202. Generally, owner data format 202 can be described as indicated in Table 13.

TABLE 13

| Name | Data Type | Description |
| --- | --- | --- |
| ID | int | Key to the owner and is used to relate other data entities to this owner. |
| Name | varchar(50) | Unique name of the owner. |

Depicted in FIG. 2, schema 200 includes role data format 209. Generally, role data format 209 can be described as indicated in Table 14.

TABLE 14

| Name | Data Type | Description |
| --- | --- | --- |
| ID | int | Key to the Role entity and is used to relate this role to Capability entities. |
| ModelID | int | Indicates what model this role entity belongs to. |
| Name | varchar(100) | A unique name for the role within this model. A role describes a type of person or user involved in performing capabilities. |
| Description | varchar(2000) | Provides a description of the role and may provide guidance to modelers in their choice of roles to associate with capabilities. |

Depicted in FIG. 2, schema 200 includes property name data format 212. Generally, property name data format 212 can be described as indicated in Table 15.

TABLE 15

| Name | Data Type | Description |
| --- | --- | --- |
| ID | int | Key to the property and is used to relate this property to capabilities. |
| Name | varchar(250) | Name of the property and is user defined. |
| Description | varchar(4000) | Description of what the property is and how it is to be used to describe capabilities. |
| DataType | int | Links to the DataType entity and indicates the type of data that is expected when a modeler sets a value for this property for a capability. If, for example, the modeler defines a property named "Fixed Cost Allocation", it is likely that the data type for this property would be "Currency". |

Depicted in FIG. 2, schema 200 includes data type data format 213. Generally, data type data format 213 can be described as indicated in Table 16.

TABLE 16

| Name | Data Type | Description |
| --- | --- | --- |
| ID | int | Key to the data type and is used to indicate the data type of a user defined property. This is one of a few tables that we assume are not modified by modelers as the modeling tools rely on the values being "known" in order to perform validations of property values correctly. |
| Name | varchar(20) | A friendly name of the data type. Examples are "Integer", "String", "Currency", etc. |
| Description | varchar(4000) | Any additional information about the data type that would be useful especially in guiding user selection of data types for the properties that they define. |

Depicted in FIG. 2, schema 200 includes item type data format 216. Generally, item type data format 216 can be described as indicated in Table 17.

TABLE 17

| Name | Data Type | Description |
| --- | --- | --- |
| ID | int | Key to the ItemType and is used to relate this item type to the input/output items (port entity). This table is assumed to be non-modifiable by modelers as the tools rely on its specific values to process models. |

TABLE 17-continued

| Name | Data Type | Description |
| --- | --- | --- |
| ItemTypeName | varchar(150) | A unique name that identifies the usage type. Examples include "Electronic data", "Physical item", "Fax", etc. |
| Description | varchar(4000) | A more detailed description of the item type and how the modeling tools may behave when dealing with a specific item type. |

Depicted in FIG. 2, schema 200 includes schema data format 217. Generally, schema data format 217 can be described as indicated in Table 18.

TABLE 18

| Name | Data Type | Description |
| --- | --- | --- |
| ID | int | This is the key to the Schema entity and is used to relate this item type to the input/output items (port entity). |
| Name | varchar(250) | This is a unique name for a schema. |
| Description | varchar(4000) | This may be a detailed description of the data content for a data record in the form of an XML schema (or some simplification thereof). |

Depicted in FIG. 2, schema 200 includes usage type data format 218. Generally, usage type data format 218 can be described as indicated in Table 19.

TABLE 19

| Name | Data Type | Description |
| --- | --- | --- |
| ID | int | Key to the UsageType and is used to relate this usage type to the input/output items (port entity). This table is assumed to be non-modifiable by modelers as the tools rely on its specific values to process models. |
| Name | varchar(150) | A unique name that identifies the usage type. Examples include "Read only", "Read and update", "Create", etc. |
| Description | varchar(4000) | A more detailed description of the usage type and how the modeling tools may behave when dealing with a specific usage type. |

Depicted in FIG. 2, schema 200 includes port data format 224. Ports corresponding to a business capability can be used to transfer input into and output out of the corresponding business capability. Generally, port data format 224 can be described as indicated in Table 20.

TABLE 20

| Name | Data Type | Description |
| --- | --- | --- |
| ID | int | Key to the port and is used to relate this port to other entities. |
| ModelID | int | Indicates that this port belongs to the related model. When dealing with a particular model, only the ports associated with the model are available to the modeler. A port is something that is input to - consumed by - a capability or output from - produced by - a capability. |
| Name | varchar(256) | A unique name within the specific model. |

TABLE 20-continued

| Name | Data Type | Description |
| --- | --- | --- |
| ItemType | int | Links to the ItemType entity which indicates the type of input or output, which could be electronic data, a physical item, a fax, an event, etc. |
| SchemaID | int | If the itemtype indicates that this is an electronic data record of some kind, this field links to the schema that describes the content of the data record. |
| Description | varchar(4000) | A detailed description of the input/output item. |
| Control | varchar(100) | Indication of controlling entity that controls the port for purposes of regulating the visibility of data flow in and out of the connector |
| Control Contact | Varchar(100) | Name, phone number, and E-mail address of the owner |
| Visibility | Complex | Visibility of port to other entities. Visibility can vary per entity. For example, visibility can be logical (yes/no) on a per entity basis. Thus, visibility can be an array of logical values. When a port is not visible to an entity, data flowing (in or out) through the port is also not visible. Different levels of visibility can also be configured. For example, visibility for general purpose use, visibility specifically for use in participating in a value added network, read-only access, read/write access, etc. |
| Visibility Data In | Complex | Visibility of data input to the port. Visibility can vary per entity and per data type. For example, visibility can be logical (yes/no) on a per entity and per data type basis. Thus, visibility can be an array of logical values (e.g., two-dimensional). Entries in the two-dimensional array can be limited to entities having visibility to the port. Different levels of visibility can also be configured. For example, visibility for general purpose use, visibility specifically for use in participating in a value added network, read-only access, read/write access, etc. |
| Visibility Data Out | Complex | Visibility of data output from the port. Visibility can vary per entity and per data type. For example, visibility can be logical (yes/no) on a per entity and per data type basis. Thus, visibility can be an array of logical values (e.g., two-dimensional). Entries in the two-dimensional array can be limited to entities having visibility to the port. Different levels of visibility can also be configured. For example, visibility for general purpose use, visibility specifically for use in participating in a value added network, read-only access, read/write access, etc. |

Depicted in FIG. 2, schema 200 includes connector port data format 222. Generally, connecter port data format 222 can be described as indicated in Table 21.

TABLE 21

| Name | Data Type | Description |
| --- | --- | --- |
| ConnectorID | int | A reference to the Connector entity and serves to link a specific connection between two capabilities with a specific input/output item. |
| PortID | int | A reference to the Port entity (input/output item) and serves to identify the input/output item that flows along a specific connection. |
| Comments | varchar(4000) | More detailed commentary about this flow of an item along this connection. |

Depicted in FIG. 2, schema 200 includes process data format 227. Generally, process data format 227 can be described as indicated in Table 22.

TABLE 22

| Name | Data Type | Description |
| --- | --- | --- |
| ID | int | Key to the Process entity and is used to relate this item type to connector entities, and through them to the related capabilities in the ProcessCapability entity. |
| ModelID | int | Indicates the model that these processes belong to. |
| Name | varchar(256) | A unique name for a process within this model. |
| Description | varchar(4000) | Describes the process that is modeled by this entity and the ProcessCapability entities. |

Depicted in FIG. 2, schema 200 includes process capability data format 226. Generally, process capability data format 227 can be described as indicated in Table 23.

TABLE 23

| Name | Data Type | Description |
| --- | --- | --- |
| ProcessID | int | Indicates the process that this capabilities and connections belong to. |
| StepNumber | int | Indicates the sequence of this connection in the process and is used to sort the process steps for rendering in a visual model. |
| ConnectorID | int | Links to the Connector entity and through it to the source and target capabilities of a process flow from a source capability to a destination capability. |
| Sequence | int | Indicates the sequence of a connection within a step, thereby supporting process flows that have multiple paths through it. To define a path where one leg has more steps (or flows through more capabilities) than another leg, the shorter leg is represented by entries in this table that reference the same connector but different StepNumbers. |
| Condition | varchar(4000) | Stores comments on what the conditions are that drive the process. |

It should be understood that schema 200 is merely one example of a business capability modeling schema. It would be apparent to one skilled in the art, after having reviewed this description, that embodiments of the present invention can be used with a wide variety of other business capability modeling schemas, in addition to schema 200. Further, modeling business capabilities does not require that capability attributes for all the data formats in schema 200 be accessible. For example, a capability and connecter can be used to model a business capability based on capability data format 214 and connector data format 223, without accessing capability attributes corresponding to other data formats. Thus, schema 200 defines data formats for business capability attributes that are accessed, but does not require that all data formats be populated to generate a business capability model.

Accordingly, in some embodiments, the business capabilities for an organization are included together in a collection of business capabilities modeled in accordance with a schema. A collection of business capabilities can be represented as a (e.g., structured or schematized) business capability model. An organization can formulate business capability attributes representing current performance of their collection of business capabilities. A modeling application (not shown) can receive the business capability attributes (e.g., from a business capability business layer) and model the business capability attributes into a business capability model. A business capability model can be represented in a variety of different ways depicting various levels of detail (e.g., up to the level of detail of the business capability attributes). A business capability model can be configured visually for output at a user-interface and/or can be retained as data for further processing.

Figure 3A:
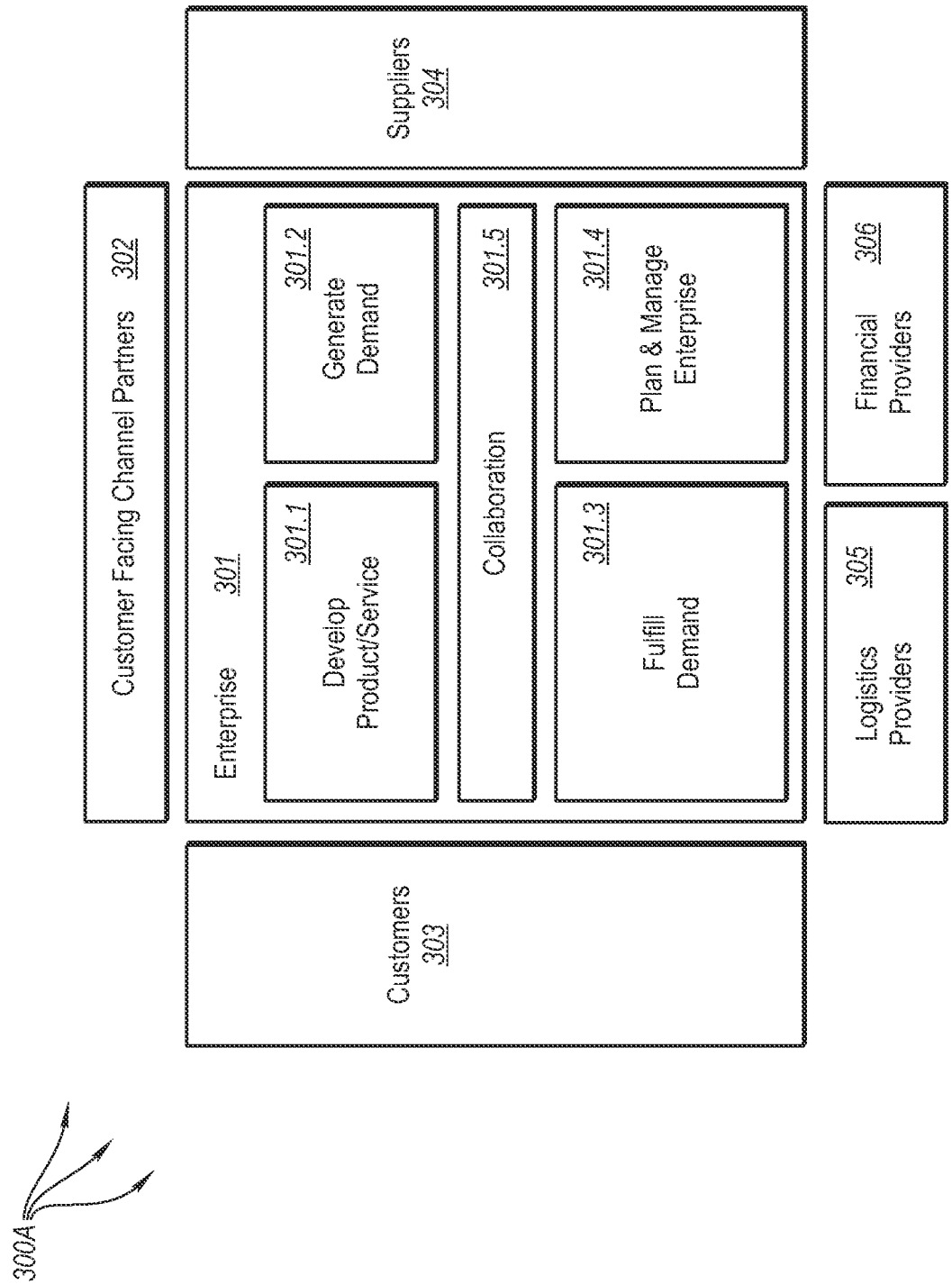
FIGS. 3A and 3B illustrate a visual representation of a collection of business capabilities at varied levels of detail.

Levels of detail can be used to represent (potentially interconnected) sub-capabilities that contribute to the performance other capabilities. FIGS. 3A through 3E depicted collections of business capabilities having various levels of detail and interconnection. Referring now to FIG. 3A, FIG. 3A depicts an example visual representation 300 (e.g., a model) of a collection of business capabilities for an organization. As depicted, the visually rendered business capabilities in visual representation 300 are rendered with varied levels of detail. For example, customer facing channel partners 302, customers 303, suppliers 304, logistic providers 305, and financial providers 306 are rendered with less detail. On the other hand, enterprise 301 is rendered with more detail, depicting other business capabilities that contribute to the performance of enterprise 301. For example, develop product service 301.1, generate demand 301.2, fulfill demand 301.3, plan and manage enterprise 301.4, and collaboration 301.5 are expressly rendered within enterprise 301. Thus, visual representation 3000 represents that develop product service 301.1, generate demand 301.2, fulfill demand 301.3, plan and manage enterprise 301.4, and collaboration 301.5 contribute to the performance of enterprise 301.

Figure 3B:
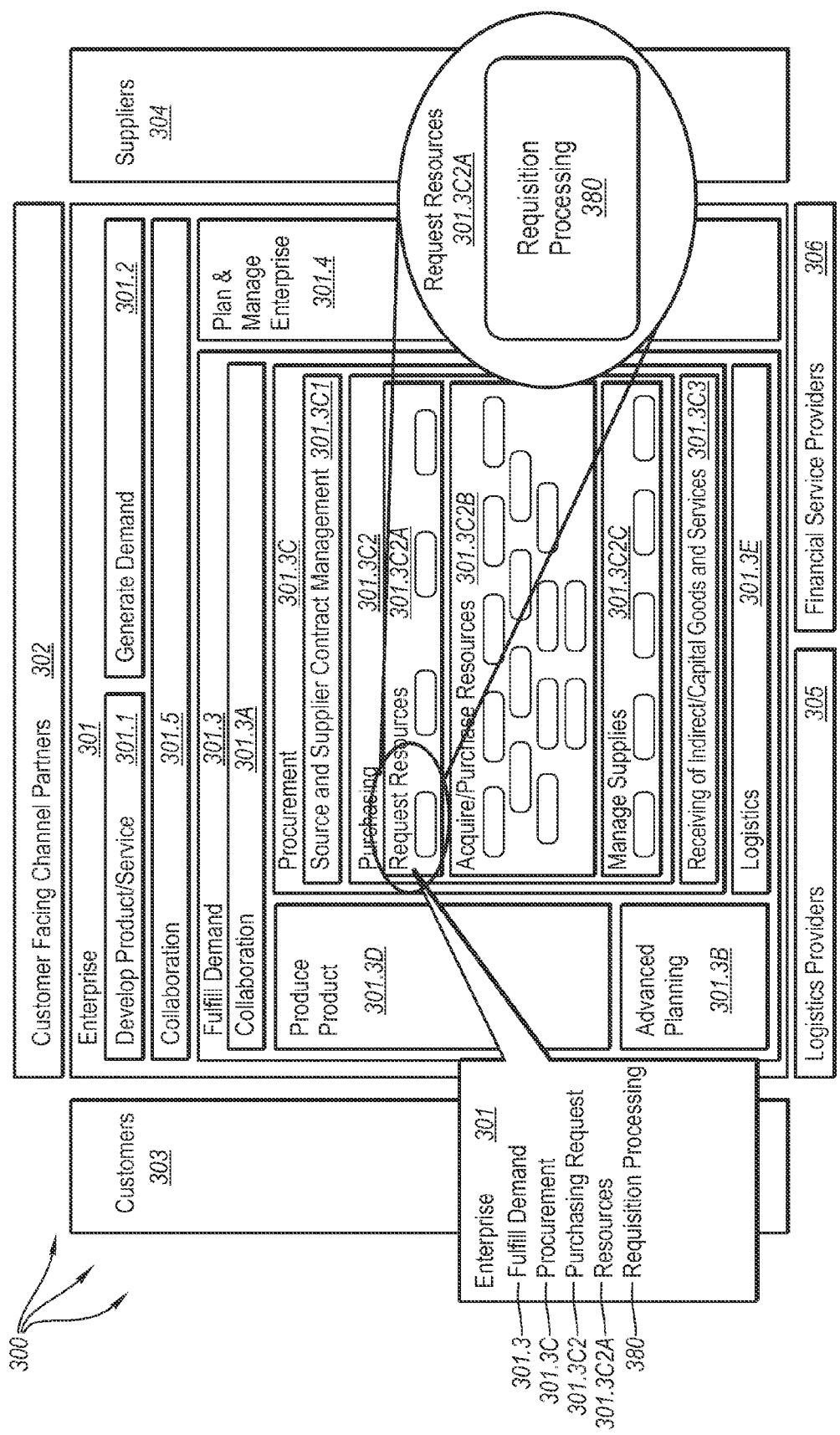

Turning now to FIG. 3B, FIG. 3B depicts visual representation 300 with further levels of detail. FIG. 3B is representative of the way business capabilities can be broken down/decomposed into other capabilities. For example, fulfill demand 301.3 is increased by a number of levels of detail. Fulfill demand 301.3 includes collaboration 301.3A, advanced planning 301.3B, procurement 301.3C, produce product 301.3D, and logistics 301.3E. Thus, collaboration 301.3A, advanced planning 301.3B, procurement 301.3C, produce product 301.3D, and logistics 301.3E contribute to the performance of fulfill demand 301.3 (and as a result also contribute to the performance of enterprise 301).

Procurement 301.3C is further detailed to include source and supplier contract management 301.3C1, purchasing 301.3C2, and receiving of indirect/capital goods and services 301.3C3. Thus, contract management 301.3C1, purchasing 301.3C2, and receiving of indirect/capital goods and services 301.3C3 contribute to the performance of procurement 301.3C (and, as a result, also contribute to the performance of fulfill demand 301.3 and performance of enterprise 301).

Purchasing 301.3C2 is further detailed to include request resources 301.3C2A, acquire/purchase resources 301.3C2B, and manage supplies 301.3C2C. Thus, request resources 301.3C2A, acquire/purchase resources 301.3C2B, and manage supplies 301.3C2C contribute to the performance of purchasing 301.3C2 (and as a result also contribute to the performance of procurement 301.3C, fulfill demand 301.3, and performance of enterprise 301). Requisition processing 380 is a further sub-capability of request resources request resources 301.3C2A.

Figure 3C:
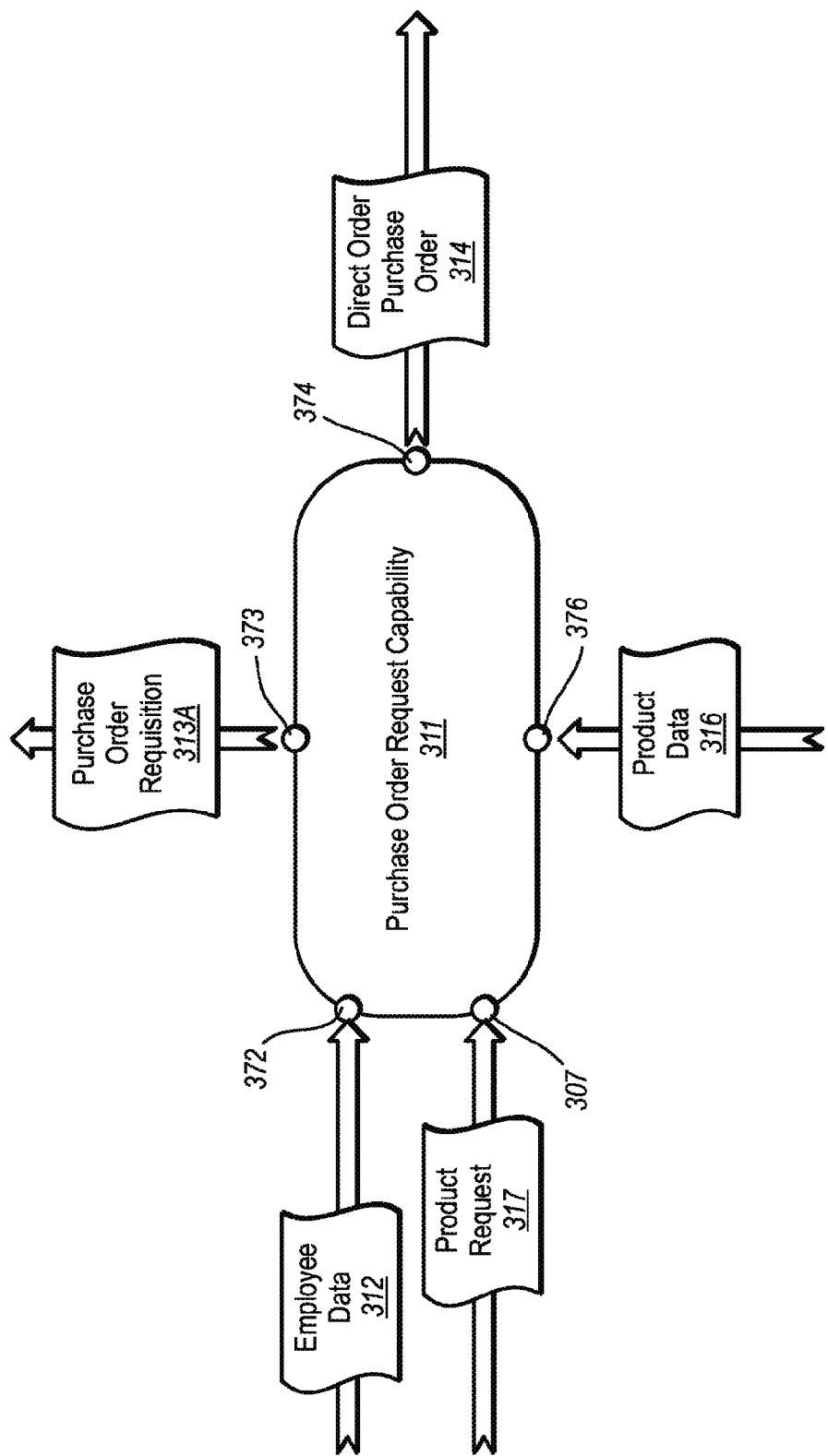
FIG. 3C illustrates an example of a modeled business capability.

Business capability models can also represent data that flows into and data that flows out of the modeled business capabilities. For example, FIG. 3C illustrates an example of a modeled business capability. FIG. 3C, includes purchase order request capability 311 (e.g., modeled based on structured capability data format). Purchase order request capability 311 includes ports 372, 376, and 307 (e.g., modeled based on a structured port data format) that receive employee data 312, product data 316, and product request 317 respectively (e.g., from other business capabilities). Purchase order request capability 311 can use employee data 312, product data 316 and product request 317 to formulate a purchase order request.

Purchase order request capability 311 includes ports 373 and 374 (e.g., modeled based on the structured port data format) that can send purchase order requisition 313A and direct order purchase order 314 respectively (e.g., to other business capabilities). Purchase order request capability 501 can include logic that determines, based on one or more of receive employee data 312, product data 316 and produce request 317, whether purchase order requisition 513A and/or direct order purchase order 314 is to be sent.

Thus, embodiments of the present invention can also utilize models of a network of business capabilities. A first business capability is modeled based upon formatted business capability attributes. A second business capability is modeled based upon the formatted business capability attributes. A connection between the first business capability and the second capability is modeled based upon the formatted business capability attributes.

Figure 3D:
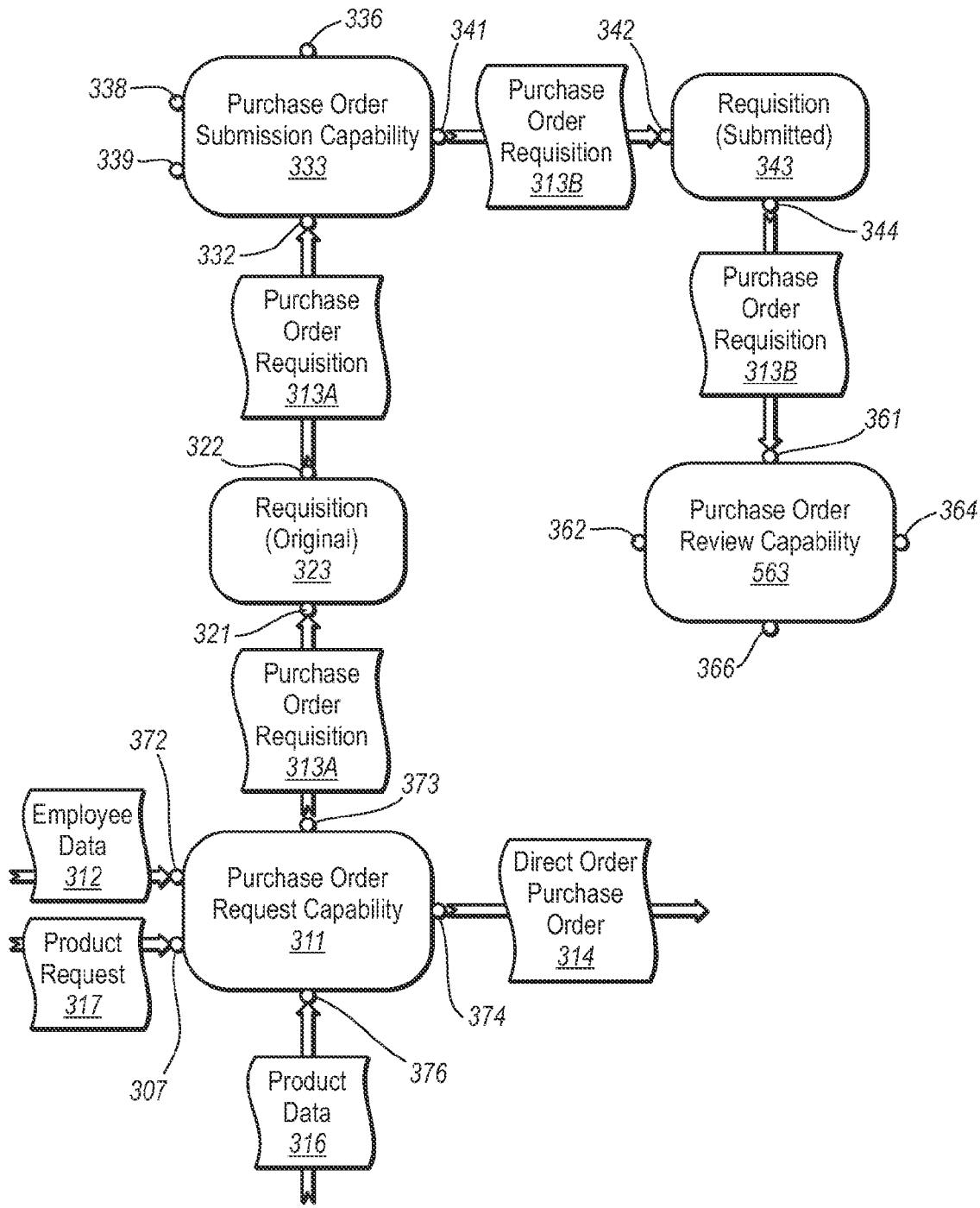
FIG. 3D illustrates a first view of an example of a network of modeled business capabilities.

FIG. 3D illustrates a first view of an example of a network of modeled business capabilities including purchase order request capability 311. As depicted, purchase order request capability 311 (a capability) sends purchase order request 313A out of port 373 to requisition 323 (a connector).

Requisition 323 receives purchase order requisition 313A at port 312. Requisition 323 sends purchase order requisition 313A out of port 322 to purchase order submission capability 333. Thus, requisition 323 transfers purchase order requisition 313A from purchase order request capability 311 to purchase order submission capability 333. Accordingly, a connector can be viewed as a business capability wherein the capability of the connector is to transfer data between other capabilities.

Purchase order submission capability 333 receives purchase order requisition 313A at port 332. Purchase order submission capability 333 includes other ports, including ports 336, 338, 339, and 341. Each of the ports 336, 338, 339, and 341 can be used to send data to and/or receive data from other capabilities or connectors. More specifically, purchase order submission capability 332 sends purchase order 313B out of port 341 to requisition 343 (a connector). Although similar to purchase order requisition 313A, purchase order requisition 313B can differ from purchase order 313A as a result of processing at purchase order submission capability 332.

Requisition 343 receives purchase order requisition 313B at port 342. Requisition 343 sends purchase order requisition 313B out of port 344 to purchase order review capability 363. Purchase order review capability 563 receives purchase order requisition 313B at port 361. Purchase order review capability 363 includes other ports, including ports 362, 364, and 366. Each of the ports 362, 364, and 366 can be used to send data to and/or receive data from other capabilities or connectors.

Although one-way ports and connectors have been depicted in FIG. 3D, it should be understood that embodiments of the present invention can include two-way ports and/or two-way connectors. For example, it may be that, from time to time, requisition 323 also transfers data from purchase order submission capability 333 (coming out of port 332 and into port 322) to purchase order request capability 311 (coming out of port 321 and into port 373). Similarly, it may be that, from time to time, requisition 343 also transfers data from purchase order review capability 363 (coming out of port 361 and into port 344) to purchase order submission capability 333 (coming out of port 342 and into port 341).

Figure 3E:
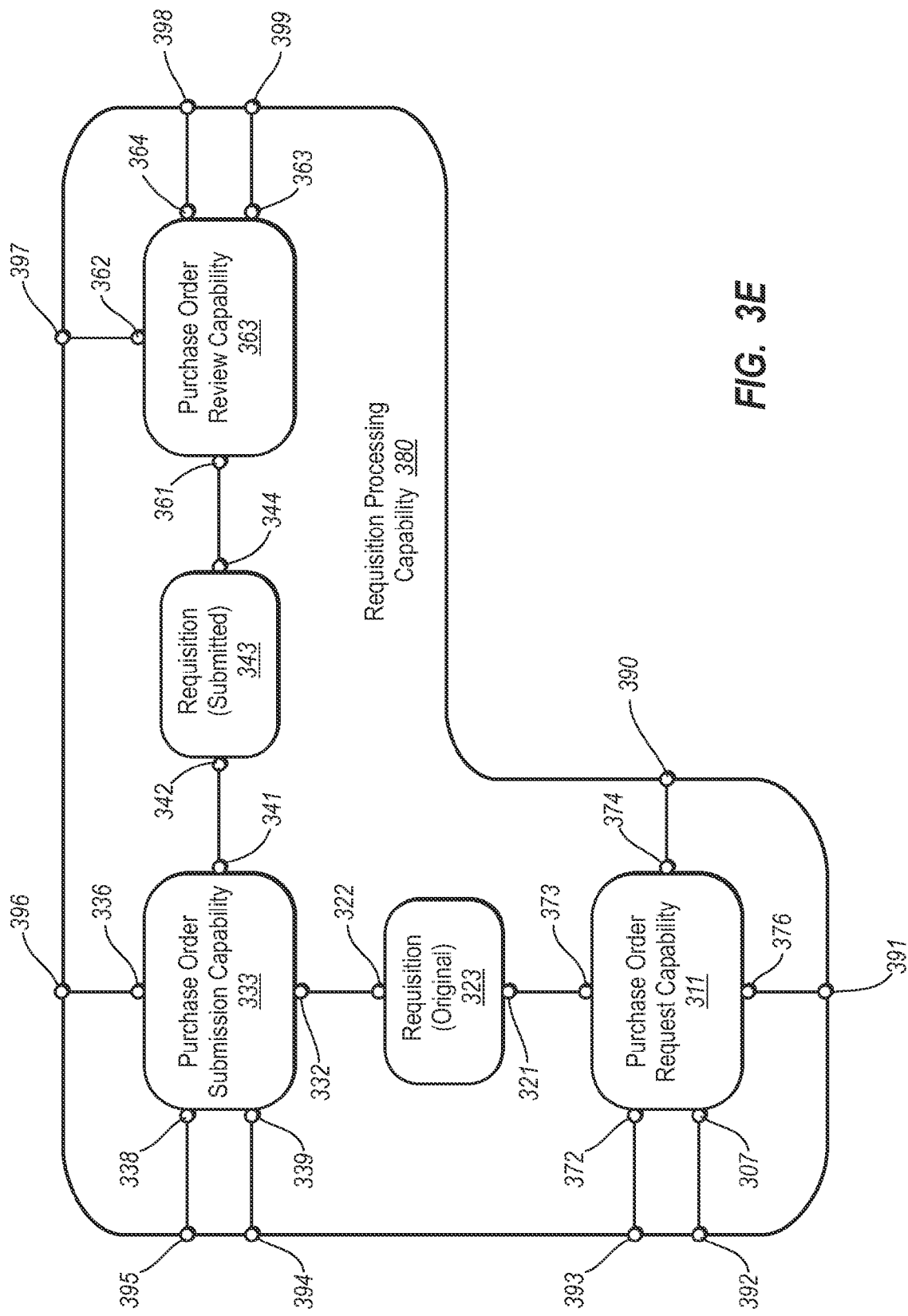
FIG. 3E illustrates a second view of the example of a network of modeled business capabilities.

A network of business capabilities can also be represented in a manner that abstracts the data exchanged between various business capabilities and connectors in the business capability network. Further, in some embodiments and as previously described, a network of more granular business capabilities (or those at higher levels of detail) can be used to model a more coarse business capability (or those at lower levels of detail). FIG. 3E illustrates a second view of the example of a network of modeled business capabilities in FIG. 3D representing requisition processing capability 380 (from FIG. 3B).

The network of business capabilities in FIG. 3E abstracts out the data that is exchanged between the business capabilities and connections in FIG. 3D. FIG. 3E further depicts that the more granular business capabilities and connections in FIG. 3D can be used to model a more coarse requisition processing capability 380. Ports 390-399 represent that requisition processing capability 380 can exchange data with other business capabilities and connectors, for example, included in request resources 301.3C2A (of FIG. 3B) or in part of some other general procurement network of business capabilities.

Although particular models have been described with respect to FIGS. 3A-3E, embodiments of the invention are not so limited. Embodiments of the invention can be practiced with virtually any type of model that represents business capabilities and/or business processes.

Figure 1C:
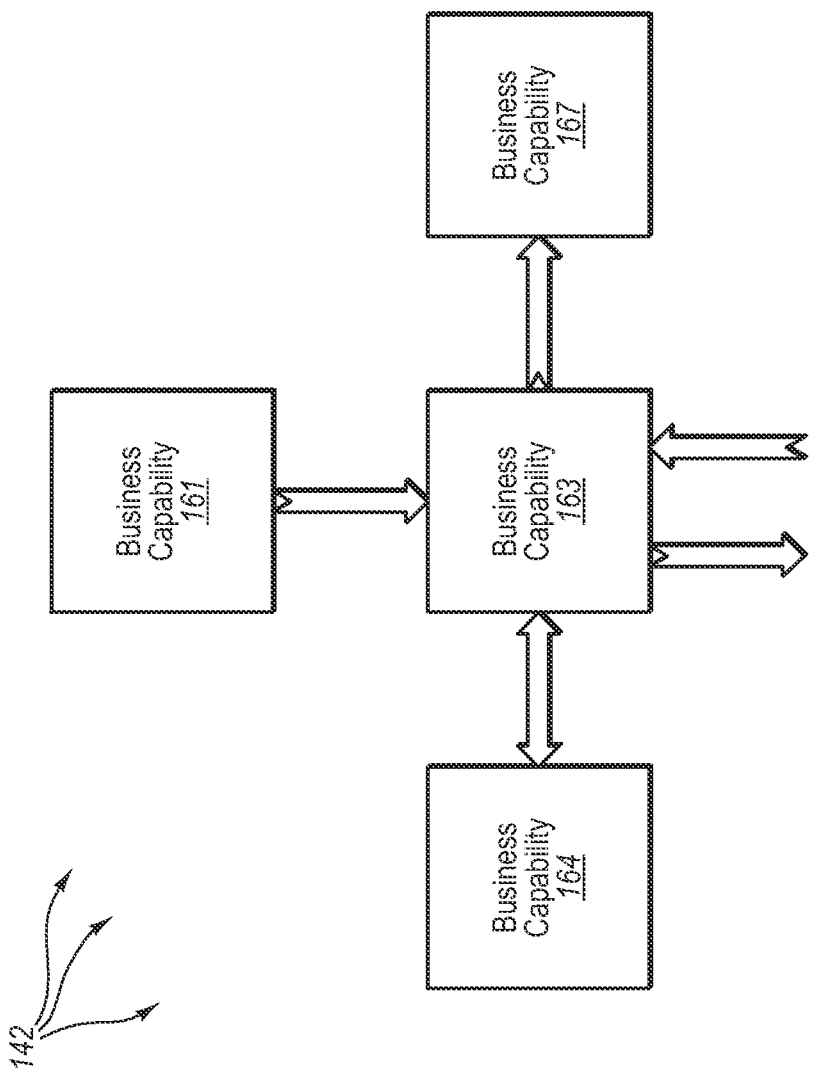
FIG. 1C illustrates a business architecture map for a value added network.

Accordingly, referring back to FIG. 1C, FIG. 1C depicts business architecture map 142 (for organization 190 and based on business capability model 103). As depicted, business architecture map 142 maps business capabilities 161, 163, 164, and 167 as well as data flows between the business capabilities (which can be either one-way or two-way). Within business architecture 142 inter-capability connections can be used to transfer data between capabilities. A connector between capabilities can include a port at one capability that sends data to and/or receives data from a corresponding port at the other end of the connector.

Figure 1D:
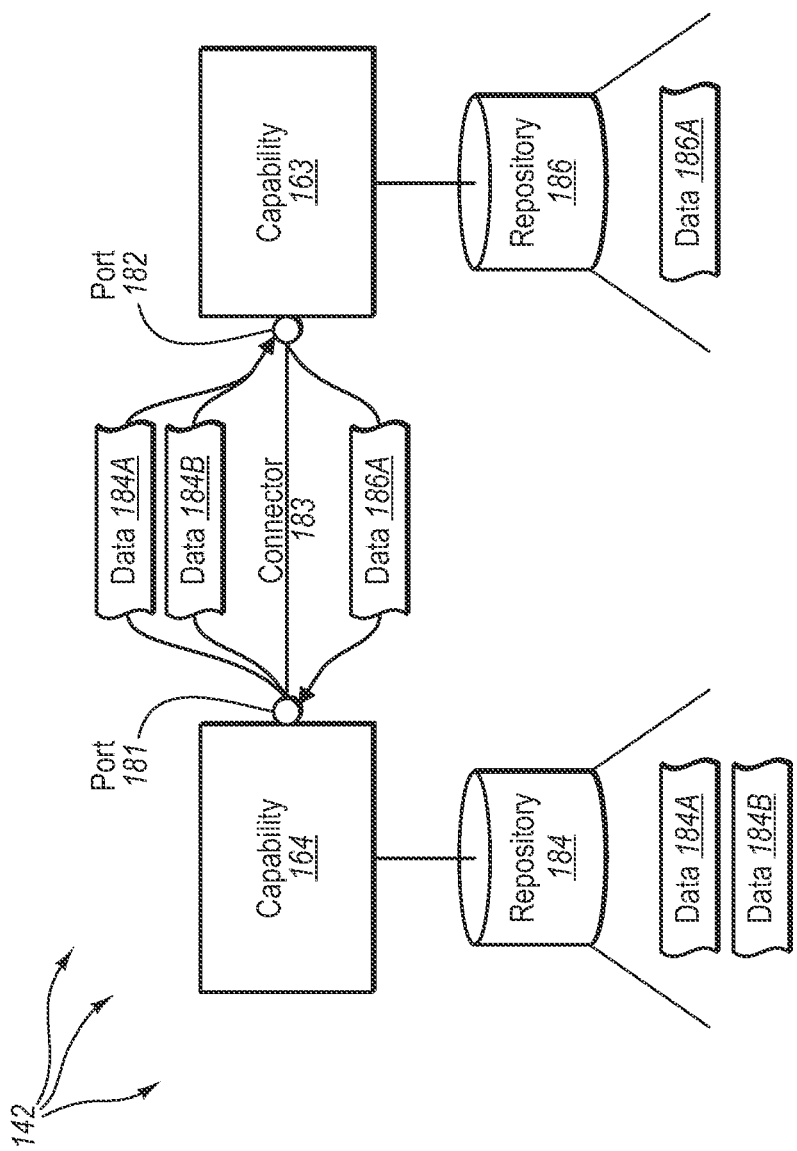
FIG. 1D illustrates a more detailed view of some business capabilities of the value added network in FIG. 1C.

For example, referring now to FIG. 1D, FIG. 1D depicts a more detailed view of capabilities 164 and 163. As depicted, connector 183 connects capability 164 and capability 163 to one another. Port 181 is configured to send data to and(/or) receive data from capability 163. For example, capability 164 can send data 184A and 184B to capability 163 and receive data 186A from capability 163 through port 181. Similarly, port 182 is configured send data to and(/or) receive data from capability 164. For example, capability 163 can receive data 184A and 184B from capability 164 and send data 186A to capability 164 through port 182. Capabilities can also store data that is sent and/or received. For example, capability 164 can store data in repository 184 and capability 163 can store data in repository 186.

Accordingly, within a capability model there are defined relationships between capabilities within a capability hierarchy. A capability that is driving one or small number of other capabilities or a capability that is driven by a small number of other capabilities has a relatively lower degree of interdependency. On the other hand, a capability that drives a number of other capabilities or is driven by a number of capabilities has a relatively higher degree of interdependency. Referring back to FIG. 1C, business capability 163 can be viewed as having a relatively higher degree of interdependency than business capabilities 161, 164, and 167.

Multiple interdependent relationships between business capabilities suggest that there are multiple data interdependencies, processes, systems and roles that support the implementation of the business capability. As such, these relatively highly interdependent capabilities are typically implemented with complex processes, multiple systems and impact a number of roles. As a result, relatively highly interdependent business capabilities can have increased complexity.

Accordingly, these relatively higher interdependent business capabilities can be considered "choke points" with respect to other surrounding capabilities. A choke point is an area of the business that impacts multiple roles, systems, processes, data and could impact the customer/partner experience. For example, business capability 163 can be considered a choke point relative to business capabilities 161, 164, and 167. A capability choke point is a potential area of business risk due to the relatively high number of interdependencies. The attributes of a connection between business capability(ies) determines if there will be a constraint between the capabilities. If connection constraints are material, a choke point can impact any number of other areas of the business in a negative manner. Accordingly, understanding the constraints of the interdependencies or connections between business capabilities provides important risk/impact insight into the organization overall or projects considered or deployed by the organization.

In some embodiments, a business capability having increased interdependency within business architecture is identified based on the number of connections between the business capability and other business capabilities in the business architecture.

Figure 4A:
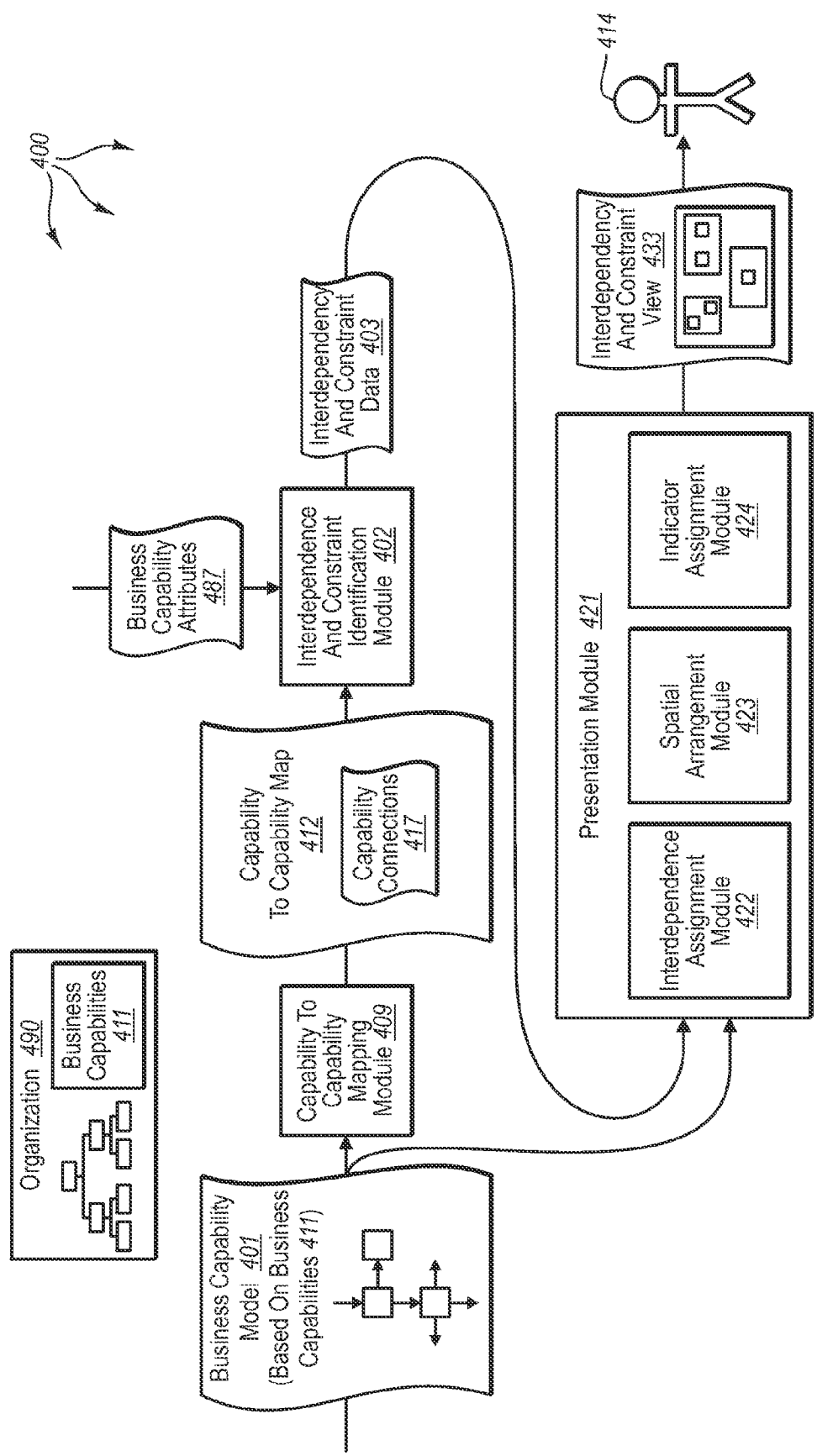
FIG. 4A illustrates an example computer architecture that can be used to determine business capability interdependency in a business architecture.

Referring now to FIG. 4A, FIG. 4A illustrates a computer architecture 400 that can be used to determine business capability interdependency in a business architecture. As depicted, computer architecture 400 includes capability to capability mapping module 409, interdependence identification module 402, and presentation module 421. Generally, capability to capability mapping module 409 is configured to receive a business capability model and map business capabilities in the business capability model to one another. Mapping business capabilities can include identifying links between business capabilities.

Interdependence identification module 402 is configured to receive a capability to capability map and generate interdependency data from the capability to capability map. Interdependence identification module 402 can determine how interdependent business capabilities are on other business capabilities in a business capability model. A business capability with increased interdependence is connected to a relatively higher number of other business capabilities. Thus, business capabilities with increased interdependence can be viewed as more valuable and/or more complex relative to other business capabilities due to their increased interconnectivity with a business architecture.

As depicted, presentation module 421 includes interdependence calculation module 422, spatial arrangement module 423, and indicator assignment module 424. Generally, presentation module 421 is configured to receive interdependency data and business capability attributes and present an independency and constraint view of business capabilities based on the interdependency and business capability attributes data. Interdependence calculation module 422 can receive interdependency data and business capability attributes and calculate the interdependence (e.g., a value) and constraints for each business capability from the interdependency data and business capability constraints. Spatial arrangement module 423 is configured to receive the interdependence (e.g., value) and constraints for each business capability and determine a spatial arrangement for business capabilities.

Indicator assignment module 424 is configured to receive the interdependence (e.g., value) and constraints for each business capability and assign indicators (e.g., colors and/or other visual effects) to business capabilities based on the interdependence and constraints. Spatial arrangement module 423 and indicator assignment module 424 can interoperate to generate graphical data representing an interdependency and constraint view of business capabilities. Presentation module 431 can present the graphical data at a display device (e.g., to a human user).

Figure 5:
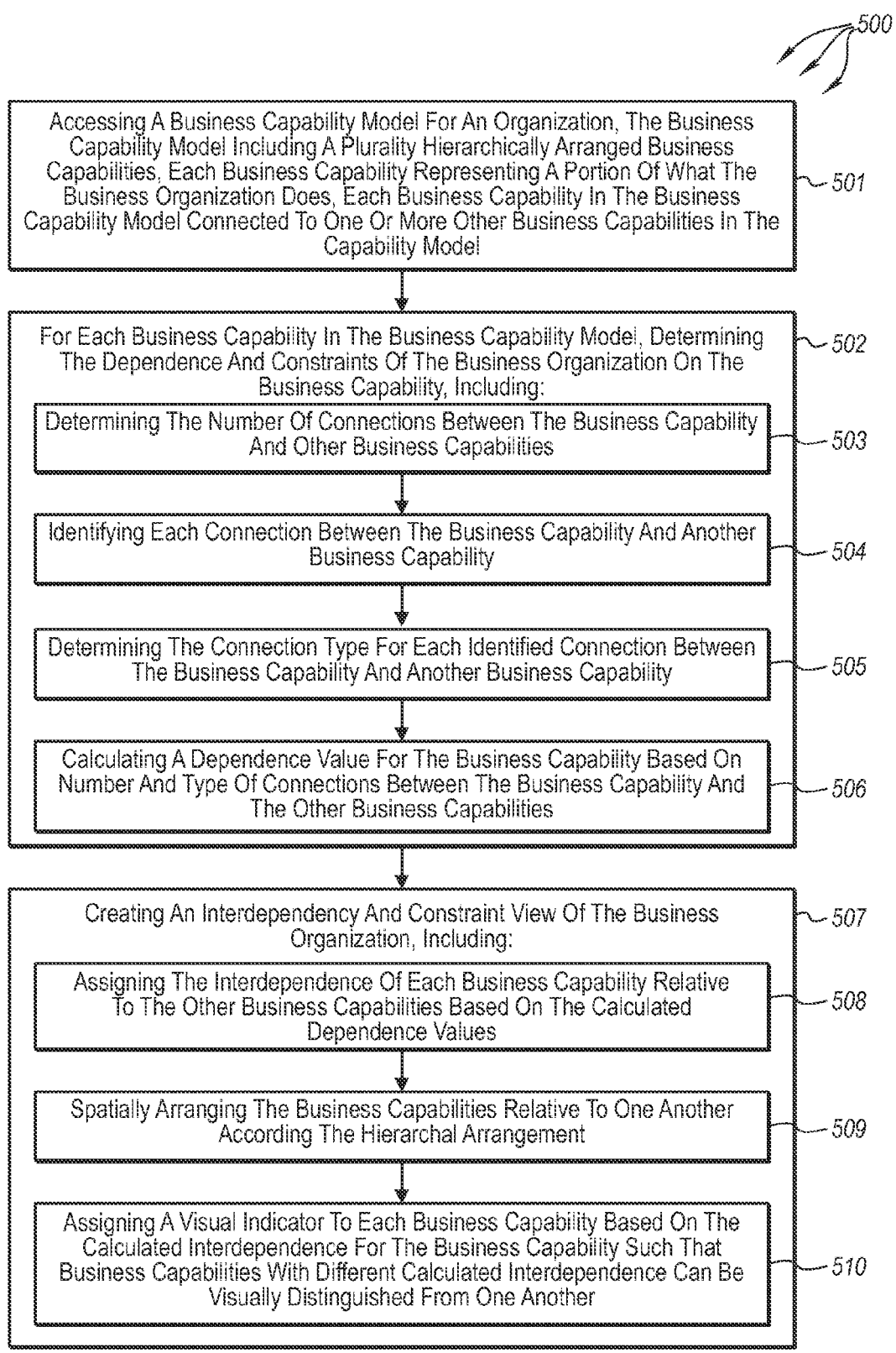
FIG. 5 illustrates an example flowchart of a method for determining interdependency between capabilities in a business capability model.

FIG. 5 illustrates an example flowchart of a method 500 for determining interdependency between capabilities in a business capability model. The method 500 will be described with respect to the components and data in computer architecture 400.

Method 500 includes an act of accessing a business capability model for an organization, the business capability model including a plurality hierarchically arranged business capabilities, each business capability representing a portion of what the business organization does, each business capability in the business capability model connected to one or more other business capabilities in the capability model (act 501). For example, capability to capability mapping module 409 can access business capability model 401. Business capability model 401 can be based on business capabilities 411, which are part of organization 490. Each business capability in business capability model 401 can be connected to one or more other business capabilities in business capability model 401.

Capability to capability mapping module 409 can receive business capability model 401. Capability to capability mapping module 409 can identify links between business capabilities 411. Accordingly, from business capability model 401, capability to capability mapping module 409 can formulate capability to capability map 412, including capability links 417. Capability to capability map 412 can map the business capabilities 411 to one another. Capability links 417 represent the connections (links) between the various business capabilities 411 within business capability model 401.

Figure 4B:
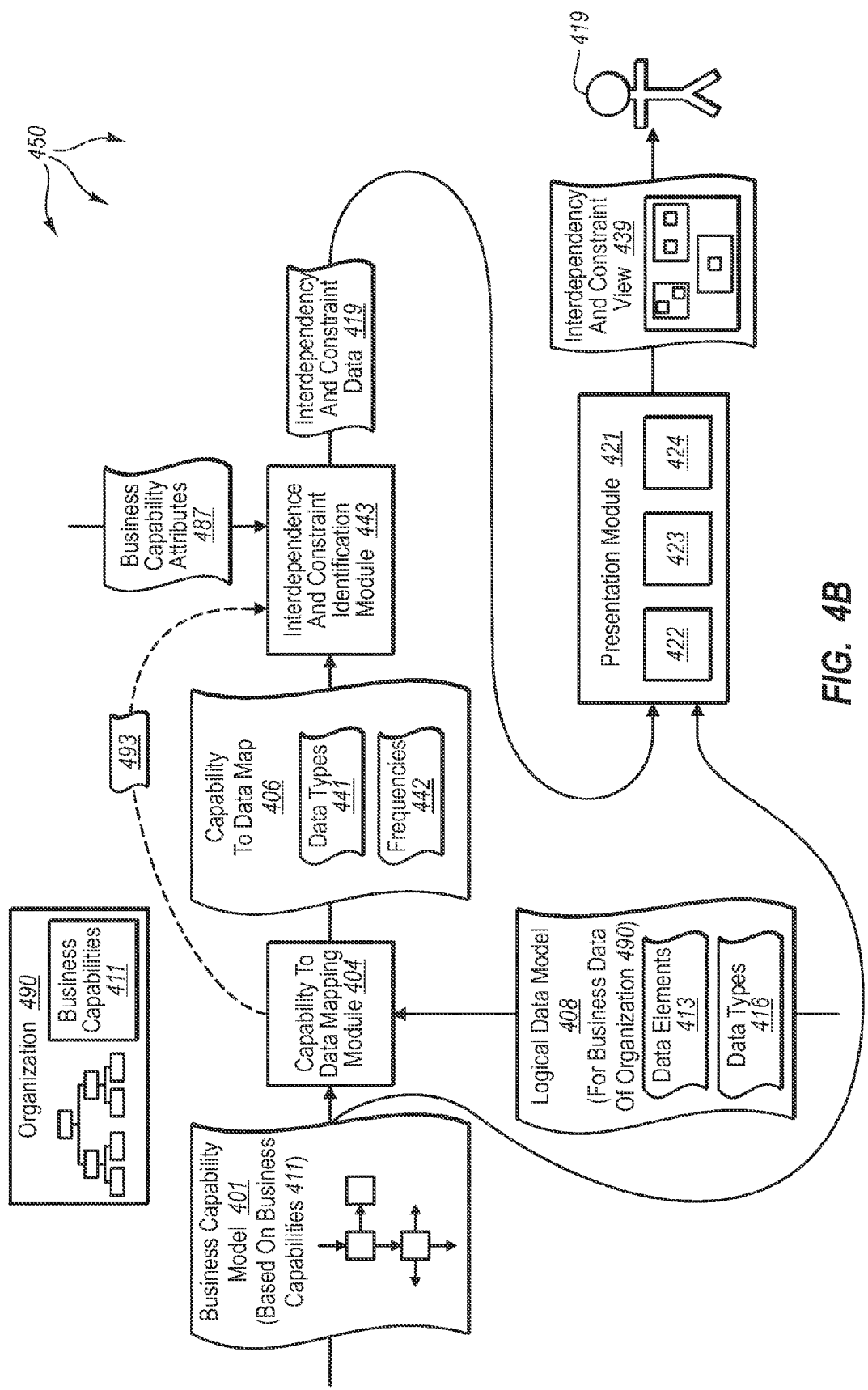
FIG. 4B illustrates another example computer architecture that can be used to determine business capability interdependency in a business architecture.
Figure 4C:
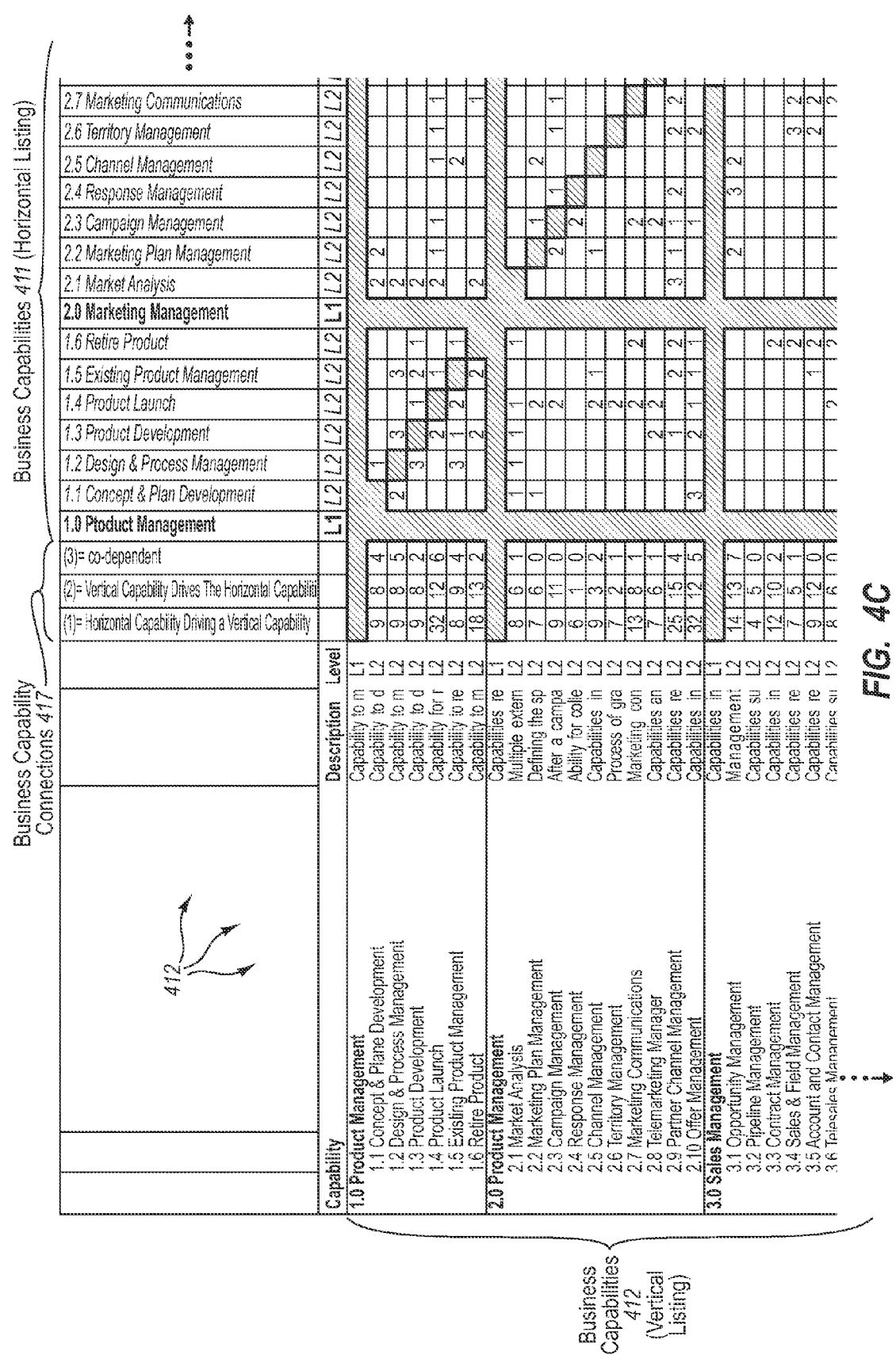
FIG. 4C illustrates an example capability to capability map based on underlying data flows between capabilities.

Turning to FIG. 4C, FIG. 4C depicts an example of the data represented capability to capability mapping 412. As depicted, business capabilities 411 are listed both vertically (as rows) and horizontally (as columns). Thus, there is a cell representing the intersection between each business capability and every other capability in business capability model 401. Empty cells represent that business capabilities are not connected to one another. For example, the intersection between "2.1 Market Analyis" (vertical) and "2.6 Territory Management" (horizontal) is empty, representing that "2.1 Market Analyis" and "2.6 Territory Management" are not connected in business capability model 401.

Cells containing numerical (or other) values represent that business capabilities are connected. Each value can represent a type of connection between the two business capabilities.

For example, "1" represents that the horizontal (as depicted in FIG. 4C) capability drives the vertical capability, "2" represents that the vertical (as depicted in FIG. 4C) capability drives the horizontal capability, and "3" represents that capabilities are co-dependent. Co-dependency can represent that a business capability both drives and is driven by (e.g., has a bi-direction connection with) another business capability.

As depicted, the intersection between "2.7 Marketing Communication" (vertical) and "2.3 Campaign Management" (horizontal) contains a value of "2". The "2" indicates that 2.7 Marketing Communication drives 2.3 Campaign Management. On the other hand, the intersection between "2.3 Campaign Management" (vertical) and "2.7 Marketing Communication" (horizontal) contains a value of "1". The "1" indicates that 2.3 Campaign Management is driven by 2.7 Marketing Communication.

The intersection between "2.10 Offer Management" (vertical) and "1.1 Concept and Plan Development" (horizontal) contains a value of "3". The value of "3 "indicates that 2.10 Offer Management and 1.1 Concept and Plan Development are co-dependent. As such, the intersection of "1. Concept and Plan Development" (vertical) and "2.10 Offer Management" (horizontal) also contains a value of "3".

Method 500 includes for each business capability in the business capability model, an act of a processor determining the dependence and the constraints of the business organization on the business capability (act 502). For example, interdependence identification module 402 can receive capability to capability map 412 and business capability attributes 487. From capability to capability map 412 and business capability attributes 487, interdependence identification and constraint module 402 can formulate interdependency and constraint data 403. Generally, interdependency and constraint data 403 represents how dependent and/or constrained organization 490 is on each of the business capabilities in business capabilities 411. Determining the dependence and the constraints of the business organization on the business capability includes determining the number of connections between the business capability and other business capabilities and constraints represented in business capability attributes (act 503). For example, interdependence and constraint identification module 402 can determine the number of connections associated with each business capability in business capabilities 411 based on capability connections 417. Further, interdependence and constraint identification module 402 can determine constraints from business capability attributes 487.

For each business capability (as listed vertically by row), the number of each type of connection is represented in business capability connections 417. For example, "1.6 Retire Product" is driven by 18 other business capabilities, drives 13 other capabilities, and is co-dependent with 2 other business capabilities. Thus, 1.6 Retire Product is associated with 33 connections. Similarly, "4.6 Support Management" is driven by 10 other business capabilities, drives 12 other business capabilities, and is co-depending with 3 other business capabilities. Thus, 4.6 Support Management is associated with 25 connections.

Determining the dependence and constraints of the business organization on the business capability includes identifying each connection between the business capability and another business capability (act 504). For example, interdependence and constraint identification module 402 can identify each connection to and/or from each business capability in business capabilities 411 from the cells in capability to capability map 412. That is, interdependence identification and constraint module 402 can identify each populated cell in capability to capability map 412.

A link indicating that a business capability is driven by another business capability represents a "from link" from the other business capability. On the other hand, a link indicating that a business capability drives another business capability represents a "to link" to the other business capability. When two business capabilities are co-dependent, the link between the two business capabilities represents both a "to link" and a "from link" (i.e., a bi-directional link) for each of the business capabilities.

Determining the dependence and constraints of the business organization on the business capability includes determining the connection type for each identified connection between the business capability and another business capability (act 505). For example, for each populated cell in capability to capability map 412, interdependence and constraint identification module 402 can determine a connection type (e.g., driven by, drives, co-dependent, etc.). Interdependence and constraint identification module 402 can determine that driven by (or from) links and drives (or to) links are one-way connections between business capabilities 411. Interdependence and constraint identification module 402 can determine that co-dependent (or bi-directional) links are two-way connections. Interdependence and constraint identification module 402 can refer individually populated cells and/or to business capabilities links 117 to determine connections types.

Determining the dependence and constraints of the business organization on the business capability includes calculating a dependence value to the business capability based on number and type of connections between the business capability and the other business capabilities (act 506). For example, interdependence identification and constraints module 402 can calculate a dependence value to each business capability in business capabilities 411. The dependence value for each business capability is based on the connection number and type information represented in capability to capability mapping 412 (and more specifically on capability links 417). Driven by (or from) links and drives (or to) links can be weighted equally when assigning dependence values. Co-dependent (bi-directional) links can be weighted more heavily (e.g., doubled) when assigning dependence values.

Interdependence and constraint identification module 402 can output the dependence and constraint values as interdependency and constraint data 403. Interdependency and constraint data 403 can include a list of business capabilities and their corresponding dependence values.

Method 500 includes an act of creating an interdependency and constraint view of the business organization (act 507). For example, presentation module 421 can receive interdependency and constraint data 403 and formulate interdependency and constraint view 433 from interdependency and constraint data 403.

Creating an interdependency and constraint view includes assigning the interdependence of each business capability relative to the other business capabilities based on the calculated dependence values (act 508). For example, interdependence assignment module 422 can assign interdependence to each business capability in business capabilities 411. Interdependence can be assigned from different levels of interdependence ranging from minimally interdependent to highly interdependent. In some embodiments, dependency values are broken into a plurality of different interdependency ranges. When a business capability's dependency value is within a range, it is assigned the level of interdependency corresponding to the range.

Creating an interdependency and constraint view includes spatially arranging the business capabilities relative to one another according the hierarchal arrangement (act 509). For example, spatial arrangement module 423 can refer to business capability model 401 to obtain the hierarchical arrangement of business capabilities 411. Creating an interdependency and constraint view includes assigning a visual indicator to each business capability based on the calculated interdependence and constraints for the business capability such that business capabilities with different calculated interdependence and constraints can be visually distinguished from one another (act 510). For example, indicator assignment module 424 can assign a visual indicator (e.g., including one or more of a color, a font, one or more effects (flashing, bold, italic, underline, varied size, etc) to each of the different interdependency range.

Spatial arrangement module 423 and indicator assignment module 424 can interoperate to generate graphical data representing interdependency and constraint view 433 (of business capabilities 411). Presentation module 421 can present interdependency view and constraint 433 at a display device (e.g., to a human user 419).

Referring now to FIG. 4B, FIG. 4B illustrates computer architecture 450 that can be used to determine business capability interdependency in a business architecture. As depicted, computer architecture 450 includes capability to data mapping module 404, interdependence identification module 443, and presentation module 421. Generally, capability to data mapping module 404 is configured to receive a business capability model and a data model (i.e. logical data model) and map business capabilities in the business capability model to elements/entities within the data model. Mapping business capabilities to data can include identifying the data that flows through the business capabilities.

Interdependence and constraint identification module 443 is configured to receive a capability to data map and generate interdependency data from the capability to data map. Interdependence assignment module 442 can determine how interdependent business capabilities are based on the type (e.g., people, process, technology data, etc.) and frequency of data that flows through the business capabilities. Interdependence and constraint assignment model 443 can also determine the relative constraints between the business capabilities based on business capability attributes 487. A business capability with increased interdependence can be associated more important data types and/or can be associated with an increase frequency of data. Business capabilities associated more important data and/or increased amounts of data can be viewed as more valuable and/or more complex relative to other business capabilities.

As depicted, presentation module 421 includes interdependence calculation module 422, spatial arrangement module 423, and indicator assignment module 424. Presentation module 421, interdependence calculation module 422, spatial arrangement module 423, and indicator assignment module 424 function similarly to their corresponding functions in computer architecture 400.

Figure 6:
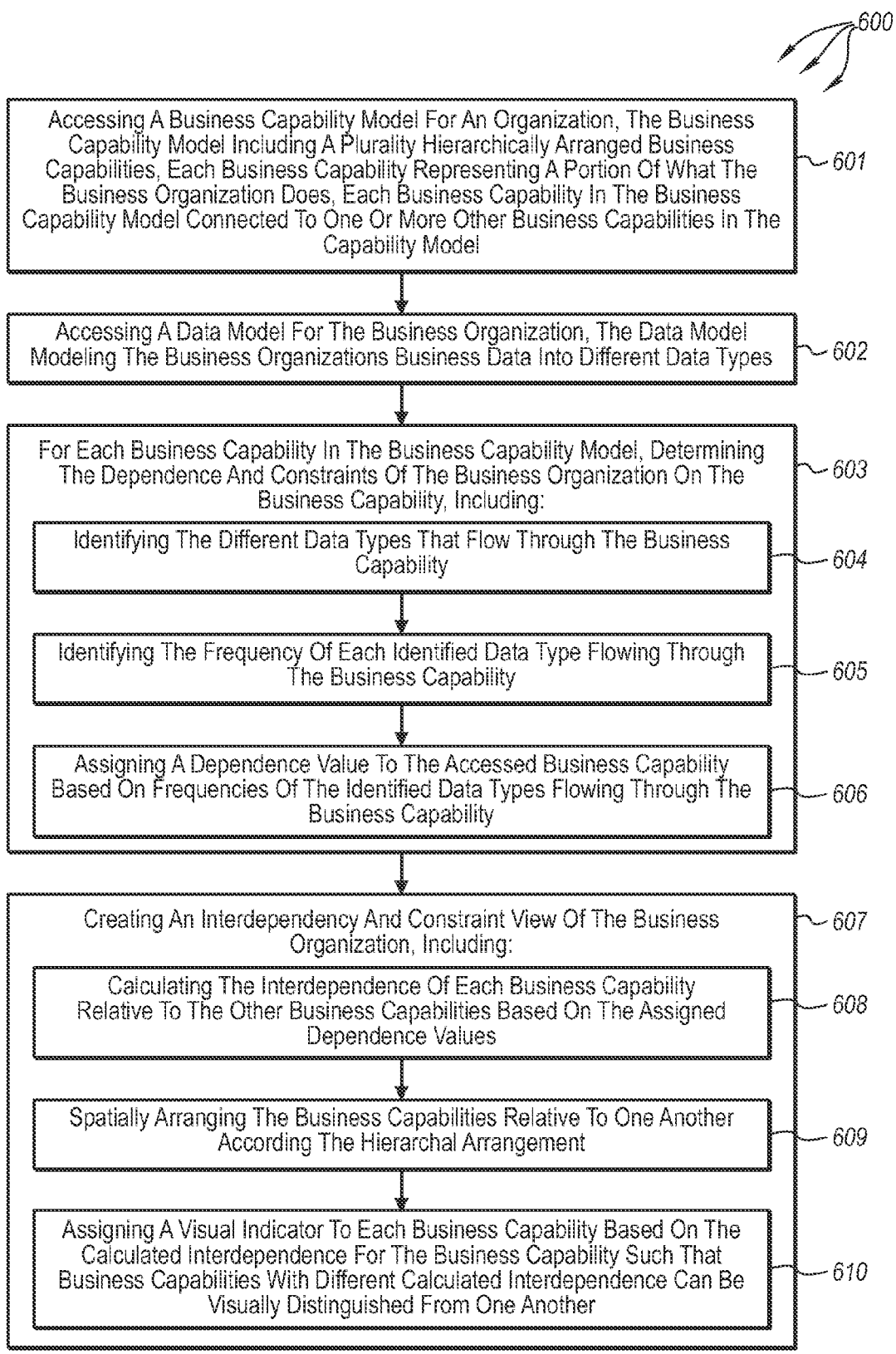
FIG. 6 illustrates an example flowchart of another method for determining interdependency between capabilities in a business capability model.

FIG. 6 illustrates an example flowchart of a method 600 for determining interdependency between capabilities in a business capability model. The method 600 will be described with respect to the components and data in computer architecture 450.

Method 600 includes an act of accessing a business capability model for an organization, the business capability model including a plurality hierarchically arranged business capabilities, each business capability representing a portion of what the business organization does, each business capability in the business capability model connected to one or more other business capabilities in the capability model (act 601). For example, capability to data mapping module 404 can access business capability model 401. Business capability model 401 can be based on business capabilities 411, which are part of organization 490. Each business capability in business capability model 401 can be connected to one or more other business capabilities in business capability model 401.

Method 500 includes an act of accessing a data model for the organization, the data model modeling the organizations business data into different data types (act 602). For example, capability to data mapping module 404 can access logical data model 408. Logical data model 408 represents business data for organization 490. Logical data 408 includes data elements 413 and data types 416. Data elements 413 represent various data elements (e.g., people, process, technology data, etc.) used within organization 490. Data types 416 represent data types for the various data elements used within organization 490.

Capability to data mapping module 404 can access business capability model 401. Capability to data mapping module 409 can data types and data frequencies of data that flows through business capabilities 411. Accordingly, from business capability model 401 and logical data model 408, capability to data mapping module 404 can formulate capability to data map 406, including data types 441 and frequencies 442. Capability to data map 414 can map the business capabilities 411 to corresponding data. Data types 441 represent the data type that flow through business capabilities. Frequencies 442 represent how many times data types flow through business capabilities.

Alternately, capability to data mapping module 404 can formulate logical data map 493. Logical data map 493 can indicate the total number of capabilities impacted by a portion of data.

Figure 4D:
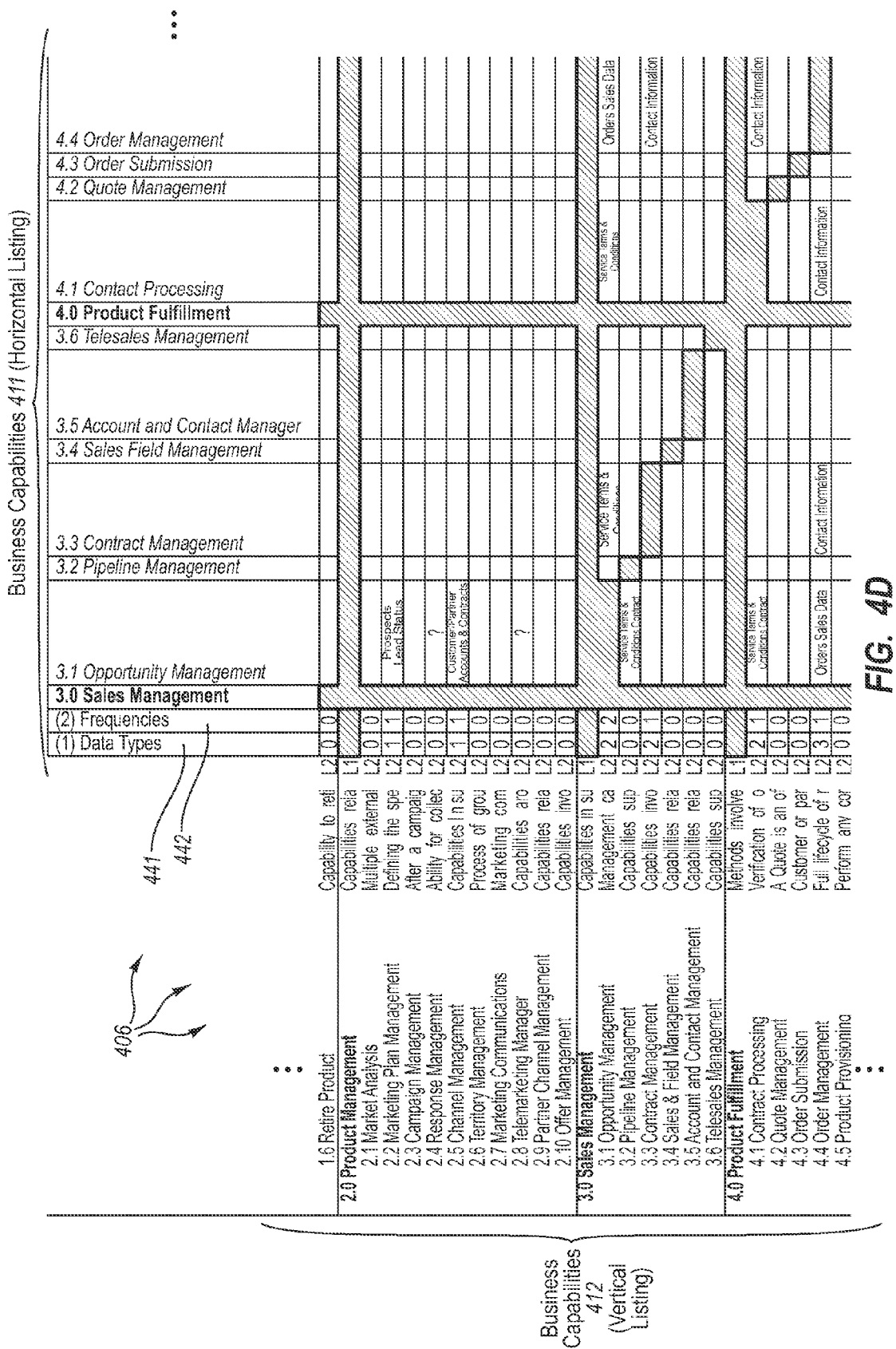
FIG. 4D illustrates an example capability to data map.

Turning to FIG. 4D, FIG. 4D depicts an example of the data represented capability to data mapping 406. As depicted, business capabilities 411 are listed both vertically (as rows) and horizontally (as columns). Thus, there is a cell representing the intersection between each business capability and every other capability in business capability model 401. Empty cells represent that data does not flow between the business capabilities. For example, the intersection between "2.1 Market Analysis" (vertical) and "3.2 Contract Management" (horizontal) is empty, representing that "2.1 Market Analysis" and "3.2 Contract Management" do not exchange data in business capability model 401.

Cells containing character string (or other) values represent that data flows between business capabilities. Different values represent different types of data. As depicted, the intersection between "2.2 Marketing Plan Management" (vertical) and "3.1 Opportunity Management" (horizontal) contains a value of "Prospect Lead Status". The "Prospect Lead Status" value indicates that prospect lead status data flows between 2.2 Marketing Plan Management and 3.1 Opportunity Management. Similarly, the intersection between "3.1 Opportunity Management" (vertical) and "3.3. Contract Management" (horizontal) contains a value of "Service Terms and Conditions". The "Service Terms and Conditions" value indicates that services terms and condition data flows between 3.1 Opportunity Management and 3.3. Contract Management.

Data type 441 indicates the number of different data types that flow through a business capability. Frequencies 442 indicate the greatest number of times a data type flows through a business capability. For example, capability to data mapping 406 indicates that "Prospect Lead Status" flows through "2.2 Marketing Plan Management" once. Thus, there is one type of data (proposed lead status data) that flows through 2.2 Marketing Plan Management and the data flows through 2.2 Marketing Plan Management once.

Capability to data mapping 406 indicates that "Service Terms and Conditions Contract" and "Contract Information" each flow through "3.3 Contract Management" once. Thus, there are two types of data (service terms and conditions contract data and contract information data). Frequency is 1, since each data type flows through 3.3 Contract Management once.

Capability to data mapping 406 indicates that "Service Terms and Conditions Contract" and "Order Sales Data" each flow through "3.3 Contract Management". "Service Terms and Conditions Contract" flows through 3.3 Contract Management twice and "Order Sales Data" flows through 3.3 Contract Management flows through 3.3 Contract once. Thus, there are two types of data (service terms and conditions contract data and order sales data). Frequency is 2, since service terms and conditions contract data flows through 3.3 Contract Management twice.

For each business capability in the business capability model, method 600 includes determining the dependence and constraints of the business organization on the business capability (act 603). For example, interdependence identification module 402 can receive capability to data map 406 and business capability attributes 487. From capability to data map 406 and business capability attributes 487, interdependence and constraint identification module 443 can formulate interdependency and constraint data 419. Generally, interdependency data and constraint data 419 represents how dependent and constrained organization 490 is on each of the business capabilities in business capabilities 411.

Determining the dependence and constraints of the business organization on the business capability includes identifying the different data types that flow through the business capability (act 604). For example, interdependence and constraint identification module 443 can refer to data types 441 to identify the number of different types of data that flow through each of business capabilities 411. Interdependence and constraint identification module 443 can also identify the types of data that flow through each of business capabilities 411. For example, interdependence and constraint identification module 443 can identifying that two types of data flows through "3.1 Opportunity Management" and that the data types are "Service Terms and Conditions" and "Order Sales Data"

Determining the dependence and constraints of the business organization on the business capability includes identifying the frequency of each identified data type flowing through the business capability (act 605). For example, interdependence and constraint identification module 443 can refer to frequencies 442 to identifying how many times data types flow through each of business capabilities 411. Interdependence and constraint identification module 443 can refer to frequencies 442 to identify that "3.1 Opportunity Management" has a frequency of 2. Interdependence and constraint identification module 443 can also independently determine frequency per data type for each of business capabilities 411 when appropriate (e.g., to determine frequencies for data types other than the highest occurring data type).

Determining the dependence and constraints of the business organization on the business capability includes assigning a dependence value to the accessed business capability based on frequencies of the identified data types flowing through the business capability (act 606). For example, interdependence and constraint identification module 443 can calculate a dependence value to each business capability in business capabilities 411. The dependence value for each business capability is based on the data types and frequency information in capability to data mapping 406 (and more specifically on data types 441 and frequencies 442)

In some embodiments, the direction of data flow and/or if data flows both to and from a business capability (a bi-directional data flow) is also considered when assigning interdependency values. In other embodiments, connections between business capabilities are considered in combination with data types and frequencies when assigned interdependency values.

Interdependence and constraint identification module 443 can output the dependence values and constraints as interdependency and constraint data 419. Interdependency and constraint data 419 can include a list of business capabilities and their corresponding dependence values and constraints.

Method 600 includes an act of creating an interdependency and constraint view of the business organization (act 607). Creating an interdependency and constraint view of the business organization includes calculating the interdependence of each business capability relative to the other business capabilities based on the assigned dependence values (act 608). Creating an interdependency and constraint view of the business organization includes an act of spatially arranging the business capabilities relative to one another according the hierarchal arrangement (act 609). Creating an interdependency and constraint view of the business organization includes assigning a visual indicator to each business capability based on the calculated interdependence and constraints for the business capability such that business capabilities with different calculated interdependence and constraints can be visually distinguished from one another (act 610). For example, presentation module 421 can receive interdependency and constraint data 419 and formulate interdependency and constraint view 439 from interdependency and constraint data 419. Interdependence assignment module 422, spatial arrangement module 423, and indicator assignment module 424 can interoperate as previously described with respect to FIG. 4A and FIG. 5. Presentation module 421 can present interdependency and constraint view 439 at a display device (e.g., to a human user 419).

Figure 4E:
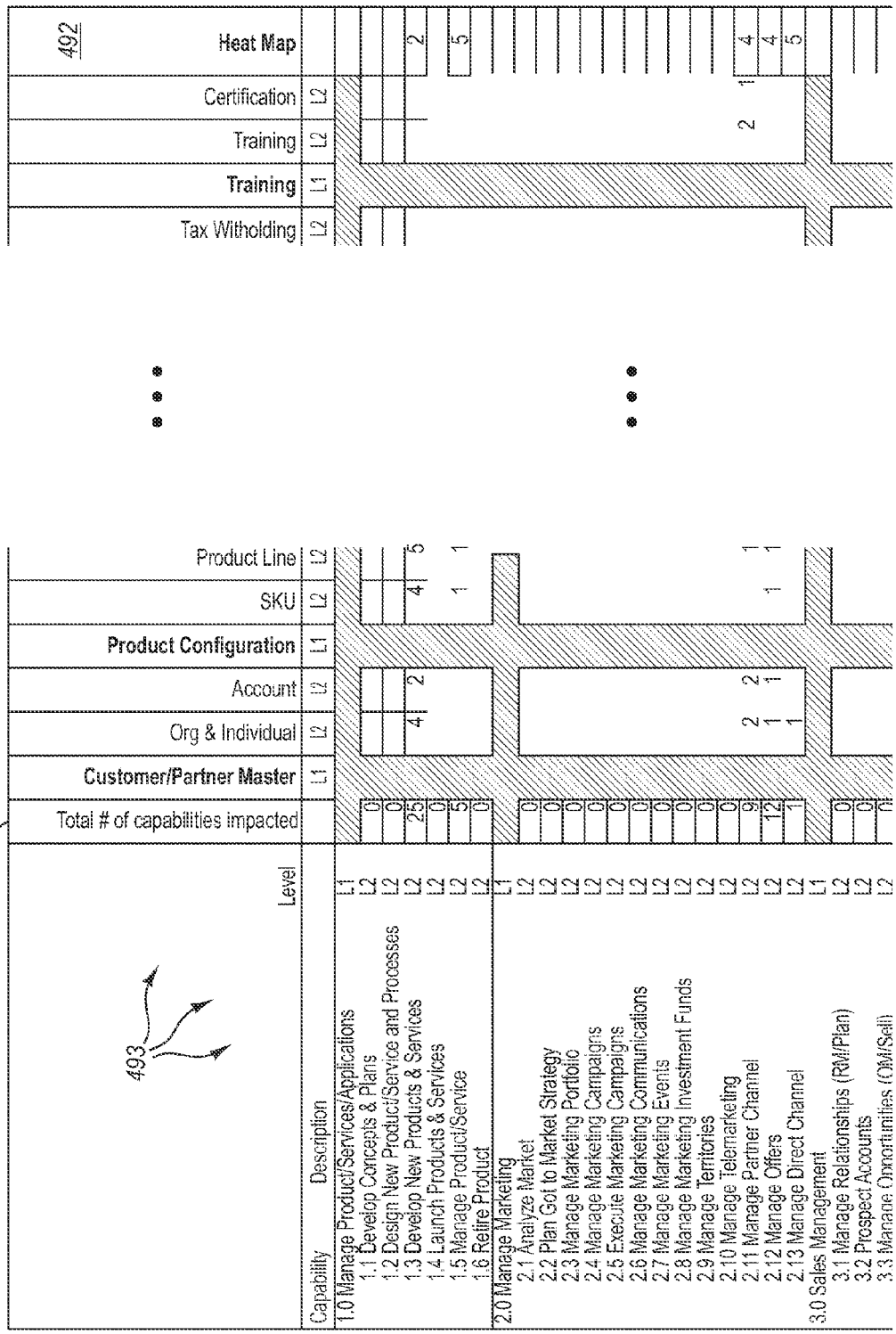
FIG. 4E illustrates an example capability to logical data map.

FIG. 4E illustrates an example capability to logical data map 493. Embodiments of the invention, for example, similar to that described with respect to method 600, can also be practiced using a capability to logical data map. For example, interdependence and constraint identification module 443 can generate interdependency and constraint data 419 from logical data map 493. For example, the total number of impact capabilities 494 can be used to generate values for heat map 492.

Generally, visual indicators can be assigned to interdependency ranges to represent the relative interdependency of business capabilities with respect to one another within an interdependency view. For example, any combination of one or more visual indicators, such as, for example, size, location, shape, background colors, outline colors, fill colors, font type, text attributes (color, bold, italic, flashing, underline, etc.), animations, etc.) can be used to represent relative interdependencies between business capabilities. In some embodiments, business capabilities with decreased interdependency are assigned colors closer to a first specified color (e.g., green) and business capabilities with increased interdependency are assigned colors to a second specified color (e.g., red).

Figure 4F:
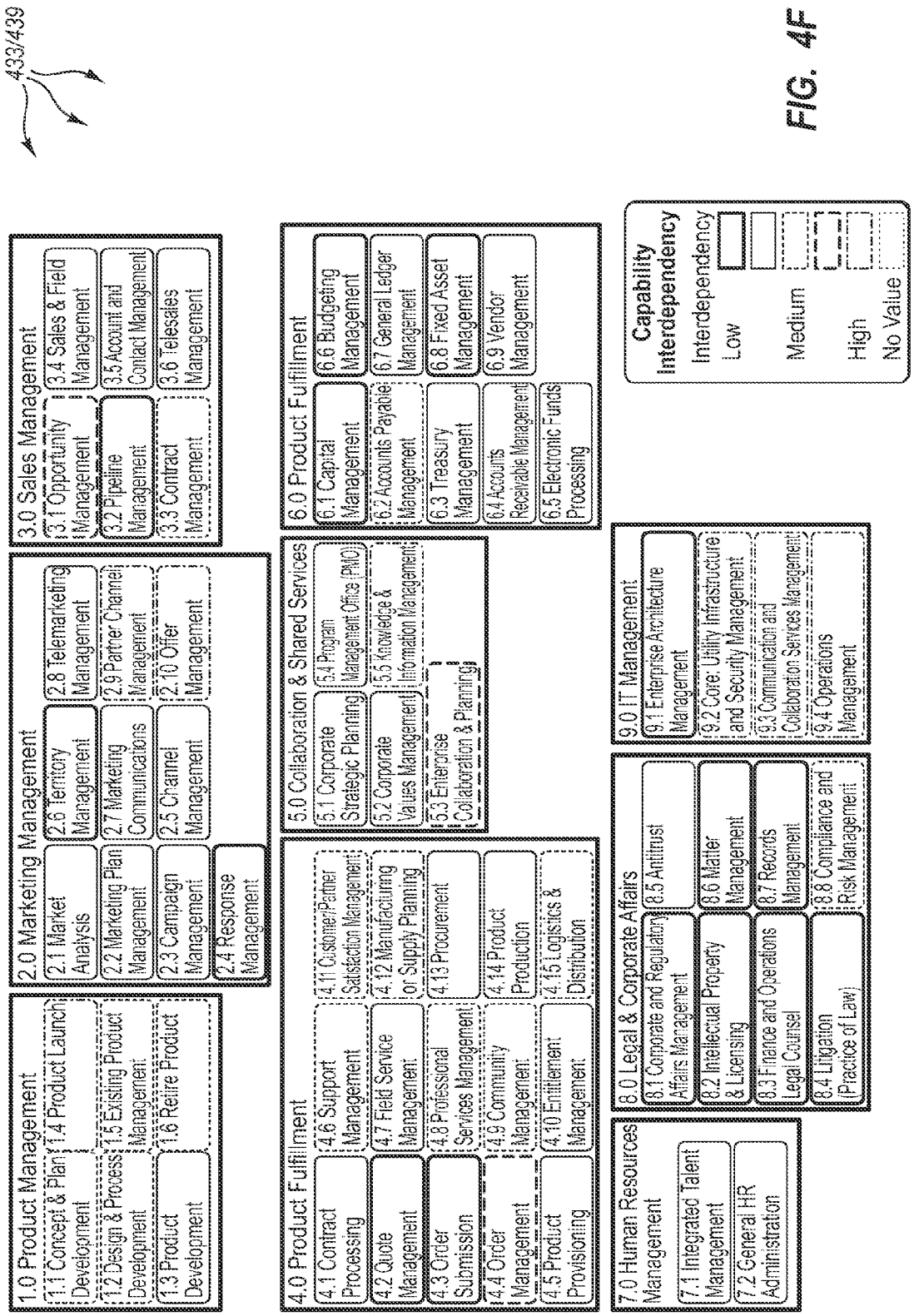
FIG. 4F illustrates an example interdependency view of business capabilities.

For example, FIG. 4F illustrates an example interdependency and constraint view (either 443 or 439) of business capabilities. As depicted in FIG. 4F, capability interdependency is in a spectrum that ranges from low (green) to high (red). Higher interdependencies are closer to red and lower interdependencies are closer to green. For example, other business capabilities are relatively more interdependent on "2.9 Partner Channel Management". As a result, organization 490 is more highly dependent on "2.9 Partner Channel Management". As such, a malfunction or unintended operation at "2.9 Partner Channel Management" impacts many other business capabilities and thus has an increased impact on organization 490. On the other hand, other business capabilities are relatively less interdependent on "5.1 Corporate Strategic Planning". As a result, organization 490 is relatively less dependent on "2.9 Partner Channel Management". As such, a malfunction or unintended operation at "5.1 Corporate Strategic Planning" impacts fewer other business capabilities and thus has a reduced impact on organization 490.

Figure 7A:
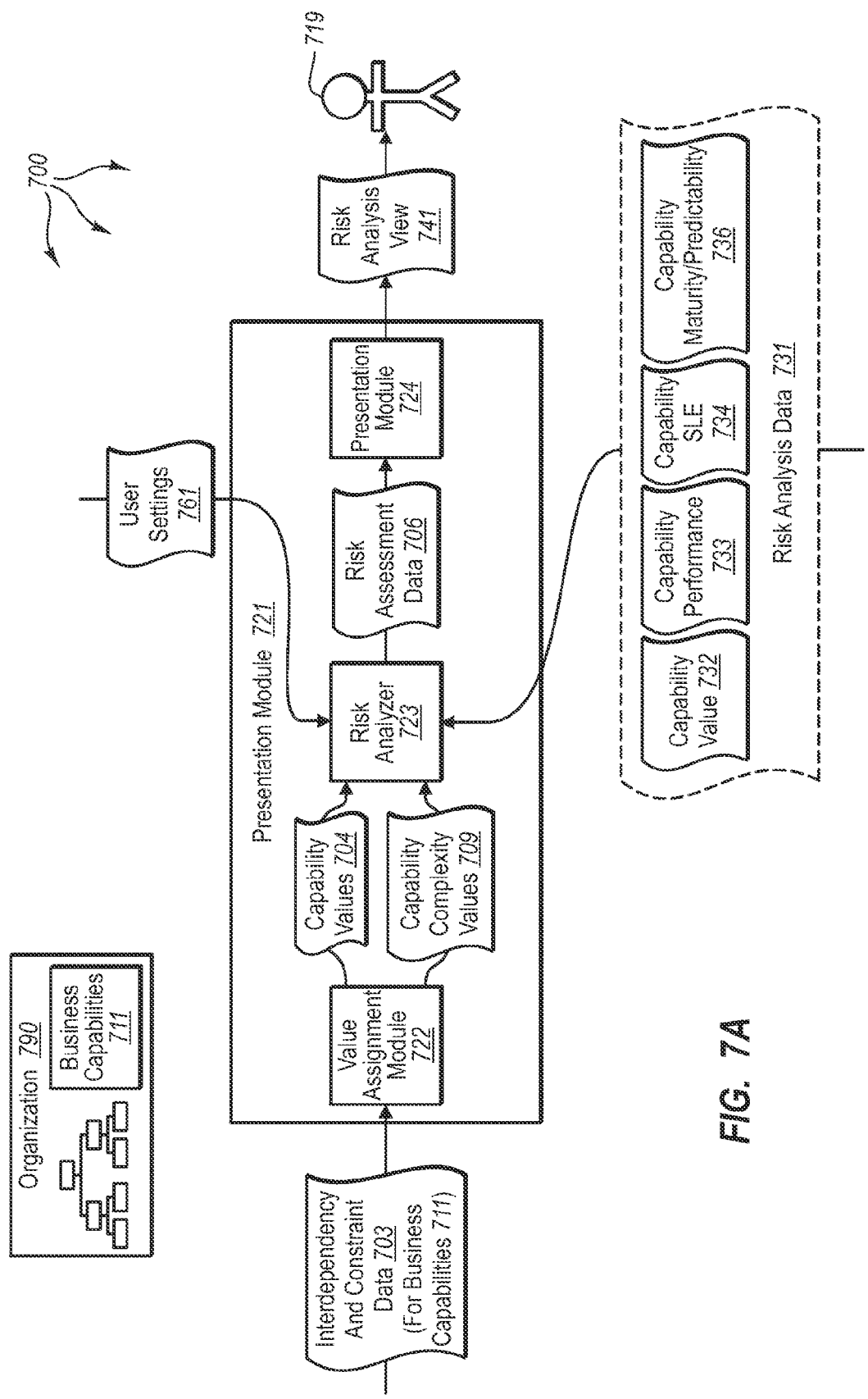
FIG. 7A example computer architecture that can be used to analyze risk in a business architecture.

FIG. 7A example computer architecture 700 that can be used to analyze risk in a business architecture. As depicted in FIG. 7A, analysis module 721 is configured to receive interdependency and constraint data for a business capability model along with risk/impact analysis data. From the interdependency and constraint data and risk/impact analysis data, analysis module 721 is configured to formulate a risk/impact analysis view (e.g., for presentation to human user 719).

As depicted, risk/impact analysis module 721 includes value assignment module 722, risk analyzer 723, and presentation module 724. Value assignment module 722 is configured to receive interdependency and constraint data for a business capability model. Form interdependency data, value assignment module 722 can assign one or more of capability interdependency values and capability complexity values to business capabilities. Value assignment module 722 can output capability interdependency values and/or capability complexity values to risk analyzer 723. Capability complexity can be determined using similar algorithms to those used to determine capability interdependency.

However, business capability complexity can be based on other factors and can differ from business capability interdependency. For example, it may be that a business capability has increased complexity, even though it has reduced connections to other business capabilities and/or a reduced amount of data flows though the business capability. On the other hand, it may be that a business capability reduced complexity, even though it has increased connections to other business capabilities and/or an increase amount of data flows though the business capability. Accordingly, value assignment module 722 can use different algorithms that consider these other factors when determining business capability complexity.

Risk analyzer 723 is configured to receive capability interdependency values and/or capability complexity values along risk/impact analysis data risk/impact analysis data can include any of a variety of different types of data, such as, for example, capability importance, capability cost, capability maturity/predictability, and capability performance, that assist an organization in determining risk associated with business capabilities. Thus, risk analyzer 723 permits an organization to consider other factors, in addition to interdependency and/or complexity, when determining business capability risk. From received capability interdependency values and/or capability complexity values and risk/impact analysis data, risk analyzer can formulate risk/impact analysis data risk/impact analysis data can indicate various levels of risk associated with business capabilities.

Presentation module 724 is configured to receive risk assessment data and formulate a risk/impact analysis view for presentation (e.g., to human user 719). Presentation module can include a spatial arrangement module and an indicator assignment module similar to those previously described. Presentation module 724 can interoperate with the spatial arrangement module and indicator assignment module to formulate risk/impact analysis view. Visual indicators can be assigned to ranges (e.g., interdependency, complexity, cost, maturity/predictability, value, etc.) to represent the relative risk of business capabilities with respect to one another within a risk/impact analysis view. For example, any combination of one or more visual indicators, such as, for example, size, location, shape, background colors, outline colors, fill colors, font type, text attributes (color, bold, italic, flashing, underline, etc.), animations, etc.) can be used to represent relative risks between business capabilities.

Thus, analysis module 721 can be used to determine the risk associated with business capabilities within organization 790. Value assignment module 722 can receive interdependency data 703 (for business capabilities 711). Interdependency data 703 can be generated using algorithms similar to those described (e.g., in FIGS. 5 and 6). Interdependency and constraint data 703 represents the interdependency and constraints among business capabilities in business capabilities 411. When appropriate, interdependency and constraint data 703 can also include additional and/or different data that facilitates the assignment of business capability complexities. From interdependency and constraint data 703, value assignment module assigns capability values 704 and/or complexity values 709 for business capabilities 711.

Risk analyzer 723 receives capability values 704 and/or complexity values 709 from value assignment module 722. Risk analyzer 723 also accesses risk/impact analysis data 731 (including capability value 732, capability performance 733, capability SLE734, and capability maturity/predictability 736). From capability values 704 and/or complexity values 709 and risk/impact analysis data 731, risk analyzer 723 formulates risk/impact analysis data 706 for organization 790.

Risk analyzer 723 can use any combination of data to determine business capability risk. For example, a user can indicate a risk/impact analysis based on any combination of one or more of: capability interdependency, capability complexity, capability cost, capability maturity/predictability and value. User settings 761 can indicate various factors to consider in formulating risk/impact analysis data.

Figure 7B:
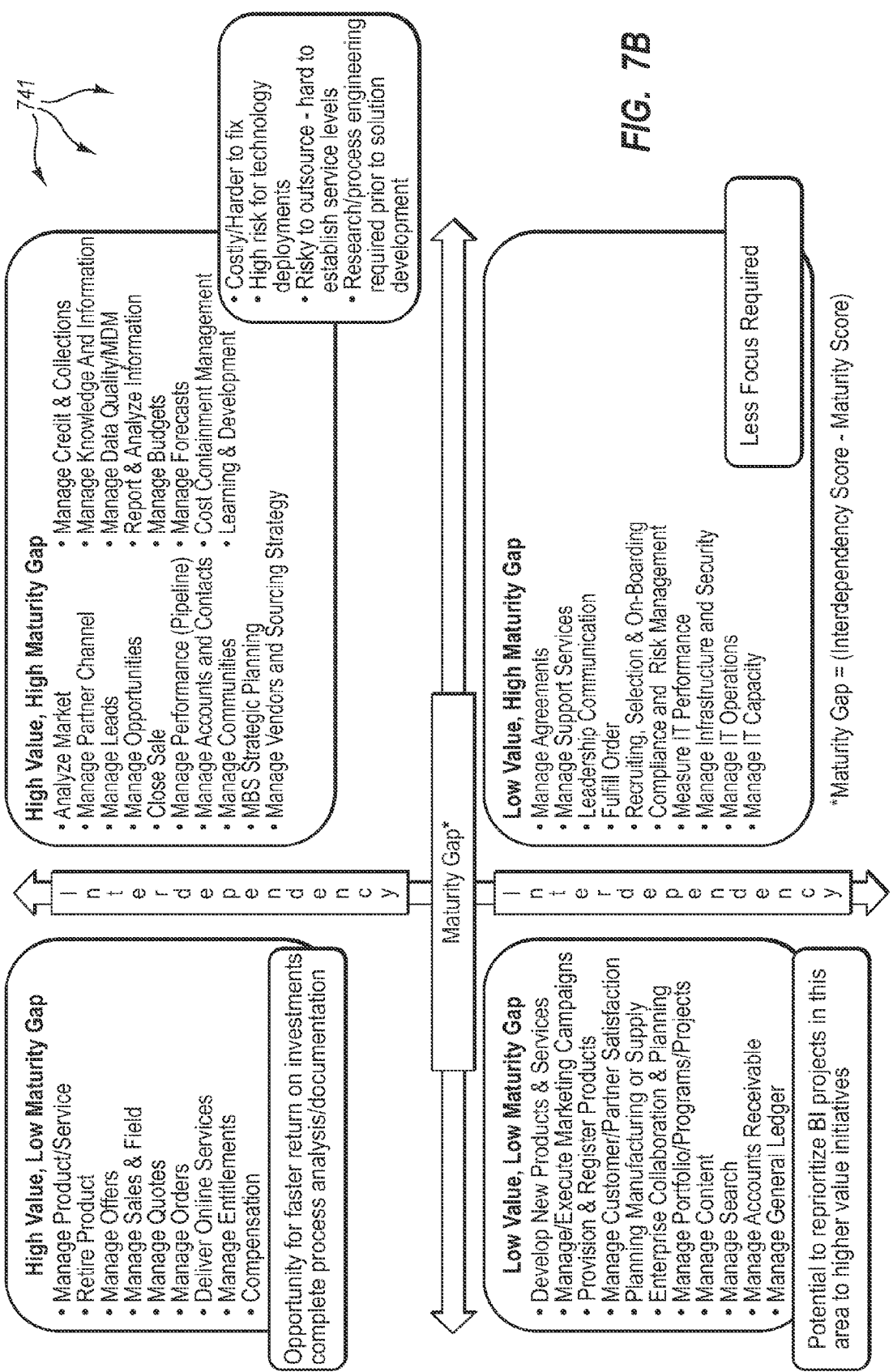
FIG. 7B illustrates an example risk/impact analysis view of business capabilities.

For example, in some embodiments, risk analyzer 723 utilizes interdependency values 704 and capability maturities 733 to formulate risk/impact analysis data 706. Presentation module 724 can then present risk/impact analysis data 706 as risk/impact analysis view 741. FIG. 7B illustrates an example risk/impact analysis view 741 of business capabilities 711. FIG. 7B depicts interdependency on one axis (the X-axis) and maturity gap on another axis (the Y-axis). From the risk/impact analysis view in FIG. 7B, it can determine which business capabilities are more interdependent and less mature (upper right quadrant), which business capabilities are less interdependent and less mature (lower right quadrant), which business capabilities are less interdependent and more mature (lower left quadrant), and which business capabilities are more interdependent and more mature (left upper quadrant).

Indicators (e.g., text color) can indicate which business capabilities are currently low performers. From low performers organization 790 can invest in improving business capabilities that can yield a faster return on investment. For example, more mature business capabilities can cost less to modify compared to less mature business capabilities. Thus, organization 790 can choose to modify (or further analyze) "manage entitlements" instead of "manage credit & collections".

Figure 7C:
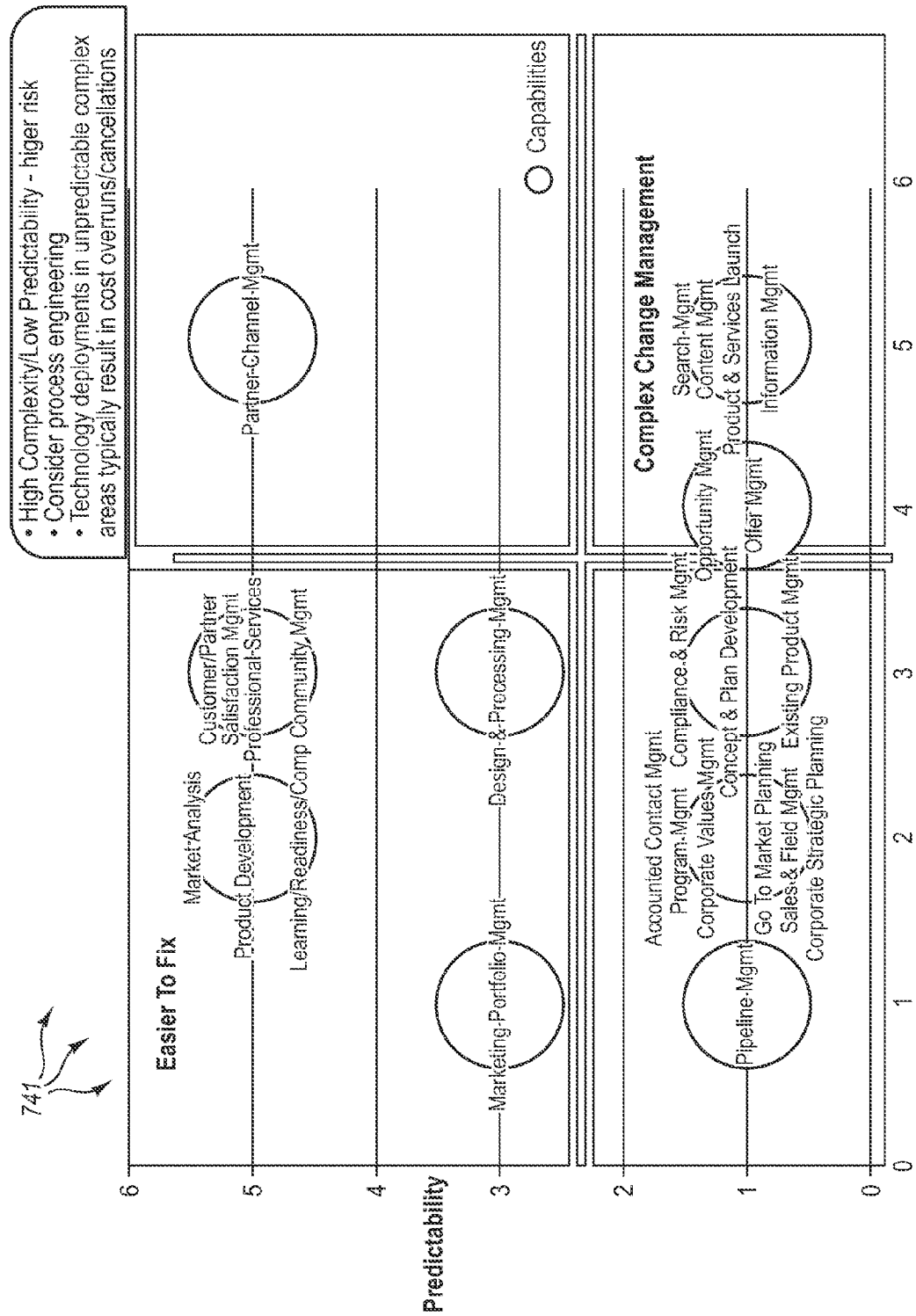
FIG. 7C illustrates an example risk/impact analysis view of business capabilities.

In other embodiments, risk analyzer 723 utilizes complexity values 709 and capability predictabilities 734 to formulate risk/impact analysis data 706. Presentation module 724 can then present risk/impact analysis data 706 as risk/impact analysis view 741. FIG. 7C illustrates an example risk/impact analysis view 741 of business capabilities 711. FIG. 7C depicts predictability on one access (the X-axis) and complexity on another axis (the Y-axis). Business capabilities within varying ranges of predictability and complexity are indicated with circles in a two dimensional space established by the X and Y axis).

Quadrants are identified using different colors to indicate different combinations of predictability/complexity. Business capabilities in the upper right quadrant ("Partner Channel Management") are more complex and more predictable. Business capabilities in the lower right quadrant (e.g., "Content Management") are more complex and less predictable. Business capabilities in the lower right quadrant can generally be viewed as more risky to organization 790. Business capabilities in the lower left quadrant (e.g., "Pipeline Management") are less complex and less predictable. Business capabilities in the upper left quadrant (e.g., "Market Analysis") are less complex and more predictable. Due to reduced complexity and increased predictability, business capabilities in the upper left quadrant can be easier to fix than business capabilities in other quadrants. This may be especially true relative to business capabilities in the lower right quadrant. Thus, organization 790 can consider predictability and complexity when determining how to allocate resources.

Figure 7D:
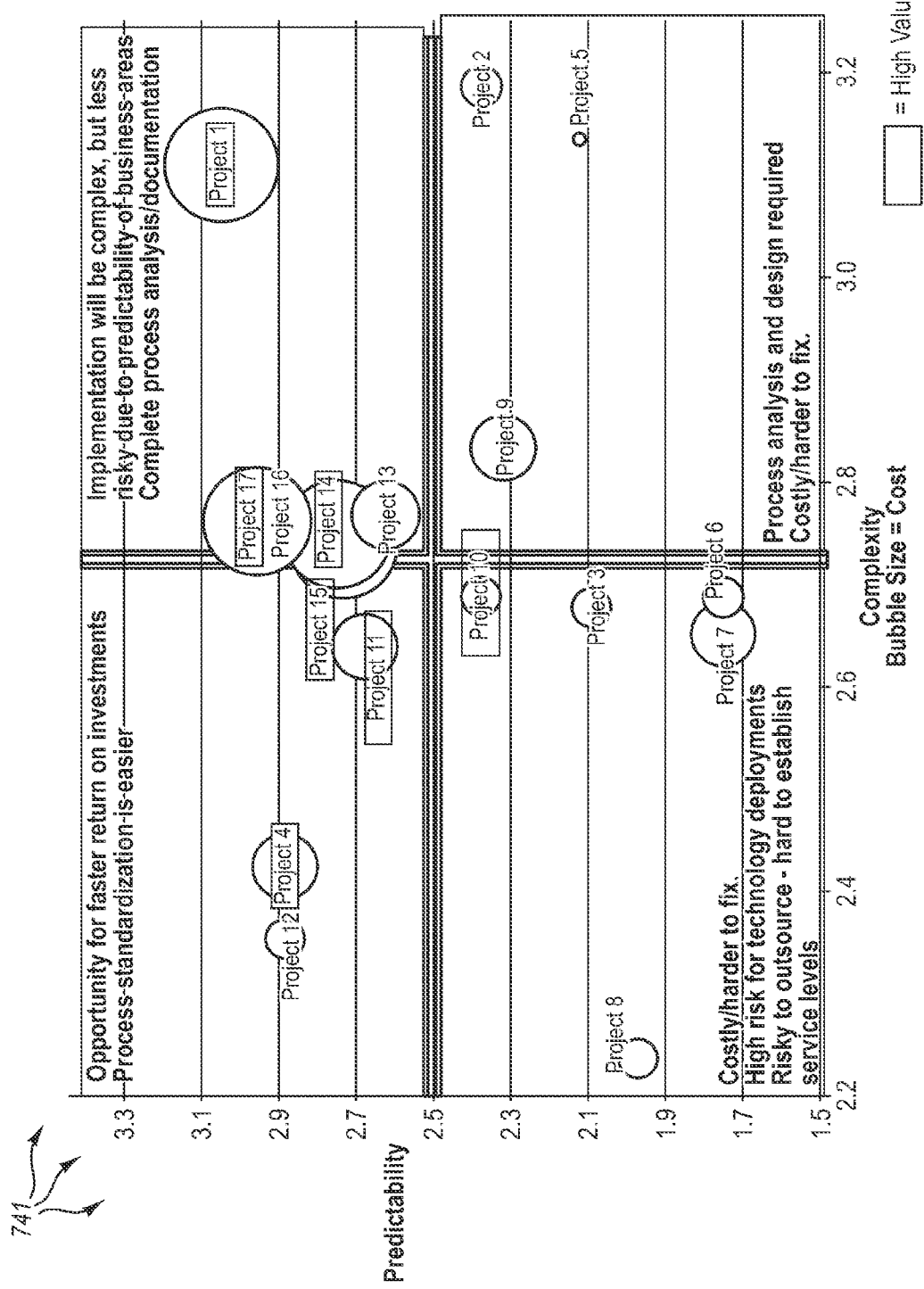
FIG. 7D illustrates an example risk/impact analysis view of programs/projects relative to business capabilities they impact and the business capability.

In other embodiments, risk analyzer 723 utilizes interdependency values, 707, complexity values 709, capability costs 732, and capability predictabilities 734 to formulate risk/impact analysis data 706. Presentation module 724 can then present risk/impact analysis data 706 as risk/impact analysis view 741. FIG. 7D illustrates an example risk/impact analysis view 741 of projects and the impact of the business capabilities 711 on the projects analyzed. The relative values of the capabilities impacted by a project imparts, for example, an average value of predictability or complexity to the project. This relative value for the project then can be depicted spatially on a x-axis and y-axis. FIG. 7D depicts predictability on one access (the X-axis) and complexity on another axis (the Y-axis). This view enables predictive risk/impact analysis on projects that are being considered or being developed.

Similar to FIG. 7C, quadrants are identified using different colors to indicate different combinations of predictability/complexity. Projects in the upper right quadrant ("Project 1") are more complex and more predictable. Projects in the lower right quadrant (e.g., "Project 2") are more complex and less predictable. Projects in the lower right quadrant can generally be viewed as more risky to organization 790. Projects in the lower left quadrant (e.g., "Project 3") are less complex and less predictable. Projects in the upper left quadrant (e.g., "Project 4") are less complex and more predictable. Due to reduced complexity and increased predictability, Projects in the upper left quadrant provide a faster return on investment compared to projects in other quadrants. This may be especially true relative to projects in the lower right quadrant.

Projects within varying ranges of predictability and complexity are indicated with circles in a two dimensional space established by the X and Y axis. The size of the circle varies as a function of cost. Larger bubbles (e.g., "Project 1") indicate increased cost. Smaller bubbles (e.g., "Project 6") indicate decreased cost. Business capabilities with higher interdependency values are outlined in red (e.g., "Project 11").

Accordingly, organization 790 can consider cost and interdependency along with predictability and complexity when determining how to allocate resources.

Accordingly, embodiments of the invention can be used to drive an understanding of the relative interdependency (complexity) of a capability and how capabilities impact one another as well as the relative risk of projects that impact or set out to change how business capabilities are implemented. Connectedness and/or data exchanged between capabilities can be used to formulate relative interdependency (complexity) of a capability and can be analyzed to inform a number of strategies from data architecture and business intelligence. Other risk/impact analysis data can be combined with interdependency (complexity) to present risk/impact analysis scenarios for organizations.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. At a computer system, the computer system including a processor and system memory, a method for identifying interdependency between business capabilities and underlying components that provide functionality to the business capabilities, the method comprising:
    an act, performed by the processor of the computer system, of accessing a business capability model for an organization, the business capability model including a plurality of hierarchically arranged business capabilities, each business capability representing a portion of what the business organization does, each business capability in the business capability model connected to one or more other business capabilities in the capability model;
    an act, performed by the processor, of creating a capability to capability map for the business capability model by:
        arranging the business capabilities in a table format with each business capability being arranged in a corresponding vertical column and a corresponding horizontal row of the table to create a grid of intersecting business capabilities, such that a cell exists representing the intersection of each business capability with every other business capability;
        for each business capability, determining whether the business capability drives or is driven by each of the other business capabilities; and
        based on the determination, assigning an visual indicator to at least some of the cells, wherein a first visual indicator is assigned to a cell when the corresponding business capability in the vertical column drives the corresponding business capability in the horizontal row, a second visual indicator is assigned to a cell when the corresponding business capability in the horizontal row drives the corresponding business capability in the vertical column, and a third visual indicator is assigned to a cell when the corresponding business capability in the horizontal row and the corresponding business capability in the vertical column drive each other;
    for each business capability in the business capability model, an act, performed by the processor of the computer system, of determining the dependence and constraints of the business organization on the business capability, including:
  an act of determining, for each business capability and based on the assigned visual indicators in the capability map, a dependence value between the business capability and other business capabilities, the dependence value based on the number of other business capabilities that the business capability drives and the number of other business capabilities that drive the business capability;
  an act, performed by the processor of the computer system, of creating an interdependency and constraints view of the business organization, including:
    an act of calculating the interdependence of each business capability relative to the other business capabilities based on the corresponding dependence values;
    an act of spatially arranging the business capabilities relative to one another according to the hierarchal arrangement; and
    an act of applying a heat map to the spatially arranged business capabilities by assigning a color from a range of colors to each business capability based on the dependence value of the business capability, wherein the range of colors is organized such that a color at one end of the range indicates that a business capability has a lower dependence value whereas a color at the opposite end of the range has a higher dependence value.

2. The method as recited in claim 1, further comprising:
  an act of accessing a plurality of business capability attributes, the plurality of business capability attributes corresponding to the business capabilities of the organization;
  an act of formatting the accessed plurality of business capability attributes in accordance with data formats defined in a structured data model;
  an act of modeling the business capability model from the formatted business capability attributes, including
    an act of modeling a first business capability from the formatted business capability attributes, the first business capability supported by a first set of people, processes, and technology and data in the business organization that indicate how the first business capability does work;
    an act of modeling a second business capability from the formatted business capability attributes, the second business capability supported by a second set of people, processes, and technology and data in the business organization that indicate how the second business capability does work; and
    an act of modeling a connection between the first business capability and the second capability from the formatted business capability attributes;
    an act of modeling constraints associated with the connection between the first business capability and the second business capability from the formatted connection attributes.

3. The method as recited in claim 1, further comprising:
  an act of presenting the interdependency and constraints view to a decision maker to assist the decision maker in making a decisions with respect to allocating resources for the organization.

4. The method as recited in claim 1, wherein the act of creating an interdependency and constraints view of the business organization comprises an act of creating a risk/impact analysis view of the business organization, the risk/impact analysis view combining the dependence values with risk/impact analysis data.

5. The method as recited in claim 4, wherein the act of creating a risk/impact analysis view of the business organization comprises an act of creating a risk/impact analysis view from one or more of business capability cost, business capability maturity/predictability, and business capability value.

6. The method as recited in claim 4, wherein the act of creating a risk/impact analysis view from one or more of business capability cost, business capability maturity/predictability, and business capability value comprises an act of assigning visual indicators to distinguish between interdependence and risk/impact analysis data.

7. The method of claim 1, wherein the capability map further includes an additional column for each of the first, second, and third visual indicator, wherein each cell in each additional column includes the number of occurrences of the corresponding visual indicator in the corresponding row.

8. A computer program product comprising one or more computer memory storage devices storing computer executable instructions which when executed by a processor of a computer system perform a method for identifying interdependency between business capabilities and underlying components that provide functionality to the business capabilities, the method comprising:
  an act, performed by the processor of the computer system, of accessing a business capability model for an organization, the business capability model including a plurality of hierarchically arranged business capabilities, each business capability representing a portion of what the business organization does, each business capability in the business capability model connected to one or more other business capabilities in the capability model;
  an act, performed by the processor, of creating a capability to capability map for the business capability model by:
    arranging the business capabilities in a table format with each business capability being arranged in a corresponding vertical column and a corresponding horizontal row of the table to create a grid of intersecting business capabilities, such that a cell exists representing the intersection of each business capability with every other business capability; and
    for each business capability, determining whether the business capability drives or is driven by each of the other business capabilities; and
    based on the determination, assigning an visual indicator to at least some of the cells, wherein a first visual indicator is assigned to a cell when the corresponding business capability in the vertical column drives the corresponding business capability in the horizontal row, a second visual indicator is assigned to a cell when the corresponding business capability in the horizontal row drives the corresponding business capability in the vertical column, and a third visual indicator is assigned to a cell when the corresponding business capability in the horizontal row and the corresponding business capability in the vertical column drive each other;
  for each business capability in the business capability model, an act, performed by the processor of the computer system, of determining the dependence and constraints of the business organization on the business capability, including:
    an act of determining, for each business capability and based on the assigned visual indicators in the capability map, a dependence value between the business capability and other business capabilities, the dependence value based on the number of other business capabilities that the business capability drives and the number of other business capabilities that drive the business capability;

an act, performed by the processor of the computer system, of creating an interdependency and constraints view of the business organization, including:

an act of calculating the interdependence of each business capability relative to the other business capabilities based on the corresponding dependence values;

an act of spatially arranging the business capabilities relative to one another according to the hierarchal arrangement; and an act of applying a heat map to the spatially arranged business capabilities by assigning a color from a range of colors to each business capability based on the dependence value of the business capability, wherein the range of colors is organized such that a color at one end of the range indicates that a business capability has a lower dependence value whereas a color at the opposite end of the range has a higher dependence value.

9. The computer program product as recited in claim 8, further comprising:

an act of accessing a plurality of business capability attributes, the plurality of business capability attributes corresponding to the business capabilities of the organization;

an act of formatting the accessed plurality of business capability attributes in accordance with data formats defined in a structured data model;

an act of modeling the business capability model from the formatted business capability attributes, including:

an act of modeling a first business capability from the formatted business capability attributes, the first business capability supported by a first set of people, processes, and technology and data in the business organization that indicate how the first business capability does work;

an act of modeling a second business capability from the formatted business capability attributes, the second business capability supported by a second set of people, processes, and technology and data in the business organization that indicate how the second business capability does work; and an act of modeling a connection between the first business capability and the second capability from the formatted business capability attributes;

an act of modeling constraints associated with the connection between the first business capability and the second business capability from the formatted connection attributes.

10. The computer program product as recited in claim 8, further comprising:

an act of presenting the interdependency and constraints view to a decision maker to assist the decision maker in making a decisions with respect to allocating resources for the organization.

11. The computer program product as recited in claim 8, wherein the act of creating an interdependency and constraints view of the business organization comprises an act of creating a risk/impact analysis view of the business organization, the risk/impact analysis view combining the dependence values with risk/impact analysis data.

12. The computer program product as recited in claim 11, wherein the act of creating a risk/impact analysis view of the business organization comprises an act of creating a risk/impact analysis view from one or more of business capability cost, business capability maturity/predictability, and business capability value.

13. The computer program product as recited in claim 11, wherein the act of creating a risk/impact analysis view from one or more of business capability cost, business capability maturity/predictability, and business capability value comprises an act of assigning visual indicators to distinguish between interdependence and risk/impact analysis data.

14. The computer program product of claim 8, wherein the capability map further includes an additional column for each of the first, second, and third visual indicator, wherein each cell in each additional column includes the number of occurrences of the corresponding visual indicator in the corresponding row.

* * * * *